US012791959B2

(12) United States Patent
Goda

(10) Patent No.: US 12,791,959 B2
(45) Date of Patent: Nov. 10, 2026

(54) IMAGE FORMING APPARATUS

(71) Applicant: CANON KABUSHIKI KAISHA, Tokyo (JP)

(72) Inventor: Junichi Goda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/217,010

(22) Filed: May 23, 2025

(65) Prior Publication Data

US 2025/0370363 A1 Dec. 4, 2025

(30) Foreign Application Priority Data

May 30, 2024 (JP) ................................ 2024-087737

(51) Int. Cl.
*G03G 15/36* (2006.01)
*G03G 15/04* (2006.01)

(52) U.S. Cl.
CPC ................. *G03G 15/04018* (2013.01); *G03G 15/04045* (2013.01)

(58) Field of Classification Search
CPC ................... G03G 15/04018; G03G 15/04045
See application file for complete search history.

(56) References Cited

U.S. PATENT DOCUMENTS

| | | | | |
|---|---|---|---|---|
| 12,222,660 | B2 | 2/2025 | Furuta et al. | |
| 2008/0111878 | A1* | 5/2008 | Fujikawa ........... | G06K 15/1247 347/236 |
| 2019/0268498 | A1* | 8/2019 | Tanimoto ........... | H04N 1/40031 |
| 2024/0069463 | A1* | 2/2024 | Furuta ................ | G03G 15/5058 |

* cited by examiner

*Primary Examiner* — Hoang X Ngo
(74) *Attorney, Agent, or Firm* — ROSSI, KIMMS & McDOWELL LLP

(57) ABSTRACT

An image forming apparatus includes a photosensitive member, an exposure head which includes a plurality of light emitting elements, and is configured to expose the photosensitive member through use of the plurality of light emitting elements to form an image, and at least one processor configured to transmit, to the exposure head, image data including pieces of data each of which indicates an image on one line in a first direction, the pieces of data corresponding to a plurality of lines arranged in a second direction orthogonal to the first direction, and to form an image corresponding to the image data on the photosensitive member through use of the exposure head, wherein the at least one processor is configured to divide the one line in the first direction into a plurality of segments.

11 Claims, 20 Drawing Sheets

IMAGE FORMING APPARATUS

BACKGROUND

Field of the Technology

The present disclosure relates to an image forming apparatus including an exposure device which includes a plurality of light emitting elements.

Description of the Related Art

An electrophotographic image forming apparatus uses toner to develop an electrostatic latent image formed by exposing a photosensitive member that is rotationally driven, to thereby form an image. In U.S. Pat. No. 12,222,660, there is disclosed an image forming apparatus which uses an exposure device which includes a plurality of light emitting chips to expose a photosensitive member. Each of the plurality of light emitting chips is formed by arranging a plurality of light emitting elements in a planar form.

An arrangement of the exposure device is sometimes displaced from an ideal position with respect to the photosensitive member. This positional displacement causes a positional displacement of the image and a decrease in image quality. The occurrence of the positional displacement is caused by, for example, an assembly error which is a displacement from an ideal assembly position at the time of assembly of the exposure device to a main body of the image forming apparatus and deformation of a circuit board itself on which the light emitting chips are mounted.

SUMMARY

An image forming apparatus according to some aspects of the present disclosure includes a photosensitive member, an exposure head which includes a plurality of light emitting elements, and is configured to expose the photosensitive member through use of the plurality of light emitting elements to form an image, and at least one processor configured to transmit, to the exposure head, image data including pieces of data each of which indicates an image on one line in a first direction, the pieces of data corresponding to a plurality of lines arranged in a second direction orthogonal to the first direction, and to form an image corresponding to the image data on the photosensitive member through use of the exposure head, wherein the at least one processor is configured to divide the one line in the first direction into a plurality of segments, correct, for each of the plurality of segments, a displacement of a position of exposure by the exposure head on the photosensitive member based on information indicating the displacement, and transmit the image data to the exposure head.

Features of the present disclosure will become apparent from the following description of embodiments with reference to the attached drawings. The following description of embodiments are by way of example.

DESCRIPTION OF THE EMBODIMENTS

At least one preferred embodiment of the present disclosure is described below with reference to the attached drawings. The at least one embodiment described below does not limit the present disclosure set forth in the appended claims. A plurality of features are described in the at least one embodiment, but the present disclosure does not necessarily require all of those plurality of features, and a plurality of features may be combined as appropriate. Further, in the attached drawings, the same or similar components are denoted by the same reference symbols, and redundant description thereof is omitted.

<Image Forming Apparatus>

Figure 1:
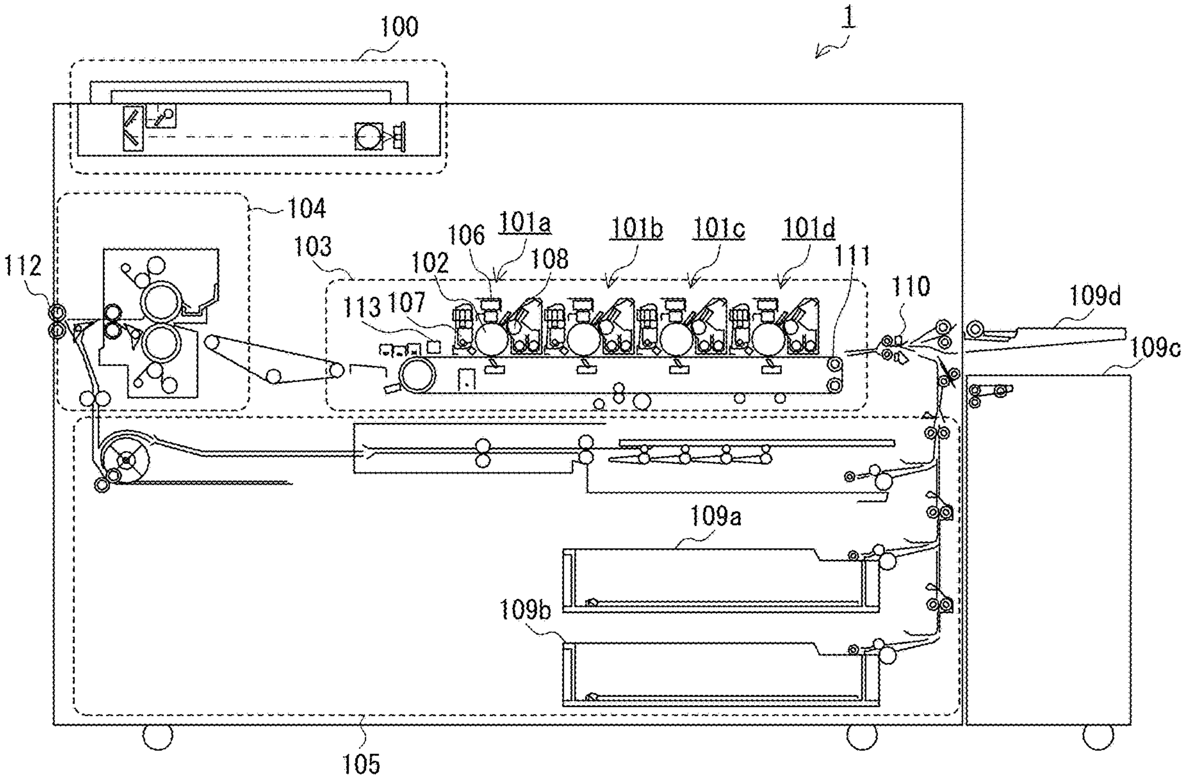
FIG. 1 is a configuration diagram of an image forming apparatus.

FIG. 1 is a configuration diagram of an image forming apparatus according to the at least one embodiment. An image forming apparatus 1 includes a reading portion 100, an image forming portion 103, a fixing portion 104, and a conveyance portion 105. The reading portion 100 optically reads an original placed on a platen to generate read image data. The image forming portion 103 forms an image on a sheet based on the read image data generated by the reading portion 100 or image data for printing acquired from an external apparatus via a network. The image forming apparatus 1 as described above is implemented by, for example, a copying machine, a multi-function machine, or a multi-function peripheral (MFP).

The image forming portion 103 includes a plurality of image forming units 101*a*, 101*b*, 101*c*, and 101*d*, a transfer belt 111 which conveys a sheet, and an optical sensor 113. The image forming units 101*a*, 101*b*, 101*c*, and 101*d* are used to form toner images in black (K), yellow (Y), magenta (M), and cyan (C), respectively. The image forming units 101*a*, 101*b*, 101*c*, and 101*d* are the same as one another in configuration, and are hereinafter also generally referred to as "image forming unit 101."

The image forming unit 101 includes a photosensitive member 102, a charging device 107, an exposure head 106, and a developing device 108. The photosensitive member 102 is an image bearing member in a drum shape having a photosensitive layer on its surface. The photosensitive member 102 is rotationally driven in a clockwise direction of FIG. 1 about a drum shaft. The charging device 107 uniformly charges the surface of the rotating photosensitive member 102 in a predetermined polarity and at a predetermined electric potential. The exposure head 106 is an exposure device which exposes the uniformly charged surface of the photosensitive member 102 to form an electrostatic latent image on the surface of the photosensitive member 102. The exposure head 106 in the at least one embodiment has a configuration in which a plurality of light emitting elements are arranged in a planar form, details of which are described later.

The developing device 108 uses developer (for example, toner) to develop the electrostatic latent image formed on the photosensitive member 102, to thereby form a toner image on the surface of the photosensitive member 102. The toner image formed on the surface of the photosensitive member 102 is sequentially transferred onto the sheet being conveyed on the transfer belt 111. The toner images on the four photosensitive members 102 are transferred onto the sheet in a superimposed manner. As a result, a color image including the four color components being black, yellow, magenta, and cyan is formed on the sheet. The optical sensor 113 optically reads an adjustment image formed on the transfer belt 111 by the image forming unit 101.

The conveyance portion 105 controls feeding of the sheet. The sheet can be fed from internal storage units 109*a* and 109*b*, an external storage unit 109*c*, and a manual feed unit 109*d*. The conveyance portion 105 feeds the sheet to a conveyance path from any one of the internal storage units 109*a* and 109*b*, the external storage unit 109*c*, and the manual feed unit 109*d*. On the conveyance path, registration rollers 110 are provided. The fed sheet is conveyed to the registration rollers 110.

The registration rollers 110 correct skew feeding of the sheet and convey the sheet onto the transfer belt 111 at an appropriate timing so that the toner image on each photosensitive member 102 is transferred at a predetermined position on the sheet. As described above, the toner images are transferred onto the sheet while the sheet is being conveyed on the transfer belt 111.

The fixing portion 104 applies heat and pressure to the sheet onto which the toner images are transferred, to thereby fix the toner images to the sheet. After the fixing of the toner images, the sheet is discharged to the outside of the image forming apparatus 1 by discharge rollers 112.

Inside the image forming apparatus 1, an image controller described later which executes, on the read image data or the image data for printing, various types of image processing such as color space conversion, filtering, varying magnification, resolution conversion, and quantization is provided. The image controller generates, from the read image data or the image data for printing, through the image processing, print image data (hereinafter sometimes simply referred to as "image data") for the image forming portion 103 to execute image forming. The image controller includes an image processing module which executes the various types of image processing described above.

In the above, description is given of the configuration in which the toner image is directly transferred onto the sheet on the transfer belt 111 from each photosensitive member 102, but the toner image may indirectly be transferred onto the sheet from each photosensitive member 102 via an intermediate transfer member. Moreover, in the above, description is given of the example in which the toner in the plurality of colors is used to form the color image, but the technology in the at least one embodiment is also applicable to an image forming apparatus which uses toner in a single color to form a monochrome image.

<Exposure Head>

Figure 2A:
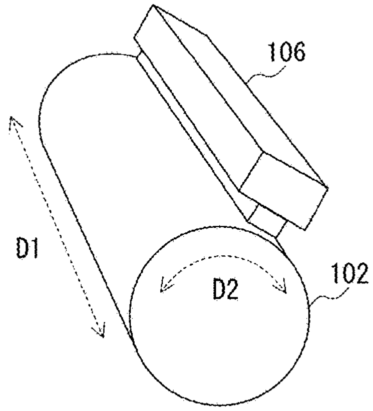
FIG. 2A and FIG. 2B are explanatory diagrams of a photosensitive member and an exposure head.
Figure 2B:
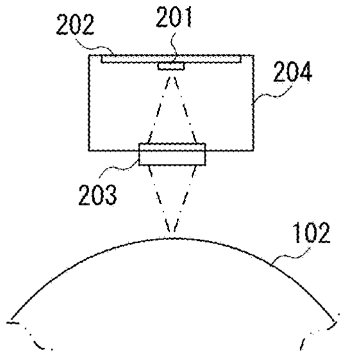

FIG. 2A and FIG. 2B are explanatory diagrams of the photosensitive member 102 and the exposure head 106. FIG. 2A is a perspective view of the photosensitive member 102 and the exposure head 106. FIG. 2B is an explanatory diagram of an exposure position. The exposure head 106 includes a light-emitting element array 201 including the plurality of light emitting elements, a printed circuit board 202 on which the light-emitting element array 201 is mounted, a rod lens array 203, and a housing 204 which holds the rod lens array 203 and the printed circuit board 202.

The photosensitive member 102 has a drum shape as described above. The exposure head 106 is parallel with a drum axial direction D1 of the photosensitive member 102 in a length direction, and is arranged such that a mounting surface of the rod lens array 203 opposes the surface of the photosensitive member 102. While the photosensitive member 102 is rotating in a circumferential direction D2, the light-emitting element array 201 (light emitting elements) of the exposure head 106 emits the light, and the rod lens array 203 focuses this light on the surface of the photosensitive member 102. The surface of the photosensitive member 102 is uniformly charged by the charging device 107, and an electric potential of a position at which the light is focused changes. The position at which the electric potential changes forms the electrostatic latent image.

In the light-emitting element array 201, the plurality of light emitting elements are arranged in a planar form. As the light emitting element, for example, an organic electroluminescence (EL) element or a light emitting diode (LED) is used. The drum axial direction D1 is a main scanning direction, and the circumferential direction D2 is a sub-scanning direction orthogonal to the main scanning direction.

Figure 3A:
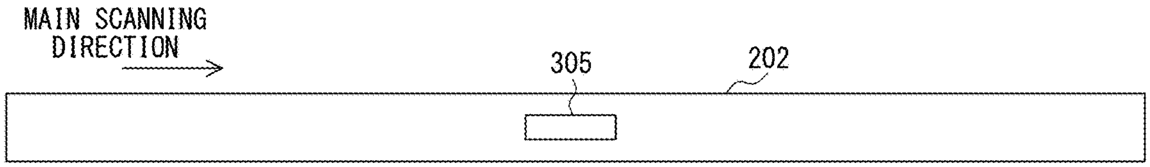
FIG. 3A and FIG. 3B are explanatory diagrams of a printed circuit board.
Figure 3B:
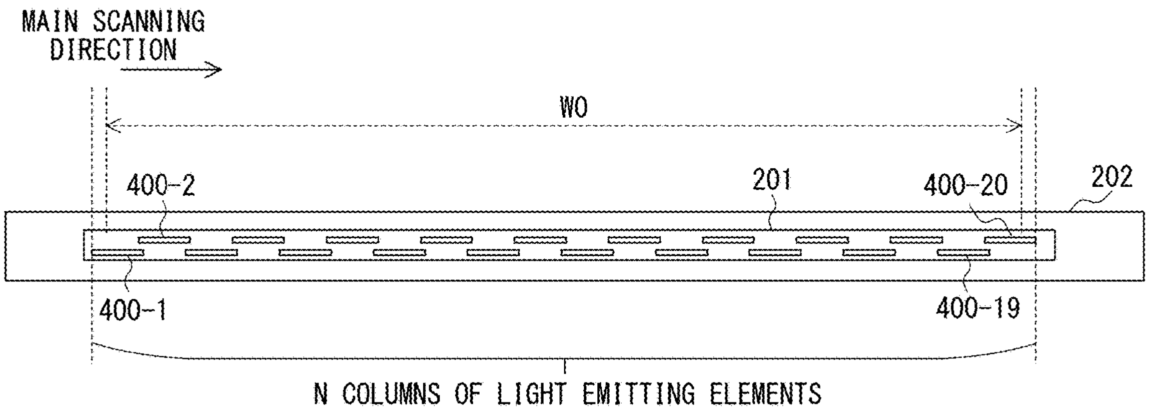

FIG. 3A and FIG. 3B are explanatory diagrams of the printed circuit board 202. On the printed circuit board 202, a connector 305 and the light-emitting element array 201 are mounted to surfaces different from each other. FIG. 3A shows the surface of the printed circuit board 202 to which the connector 305 is mounted. FIG. 3B shows the surface of the printed circuit board 202 to which the light-emitting element array 201 is mounted. The light-emitting element array 201 includes a plurality of light emitting chips 400 each of which includes the plurality of light emitting elements. In the at least one embodiment, the number of light emitting chips 400 is 20 (light emitting chips 400-1 to 400-20). The light emitting chips 400-1 to 400-20 are arranged in a staggered pattern in the main scanning direction.

As illustrated in FIG. 3B, a range occupied by all of the light emitting elements of the 20 light emitting chips 400-1 to 400-20 in the main scanning direction is wider than a range occupied by a maximum width W0 of the image indicated by the print image data. Thus, some light emitting elements positioned at both ends in the main scanning direction may not be used to expose the photosensitive member 102 as long as the positional displacement of the image is not detected. Each light emitting chip 400 of the printed circuit board 202 is connected to the image controller described later via the connector 305.

Figure 4:
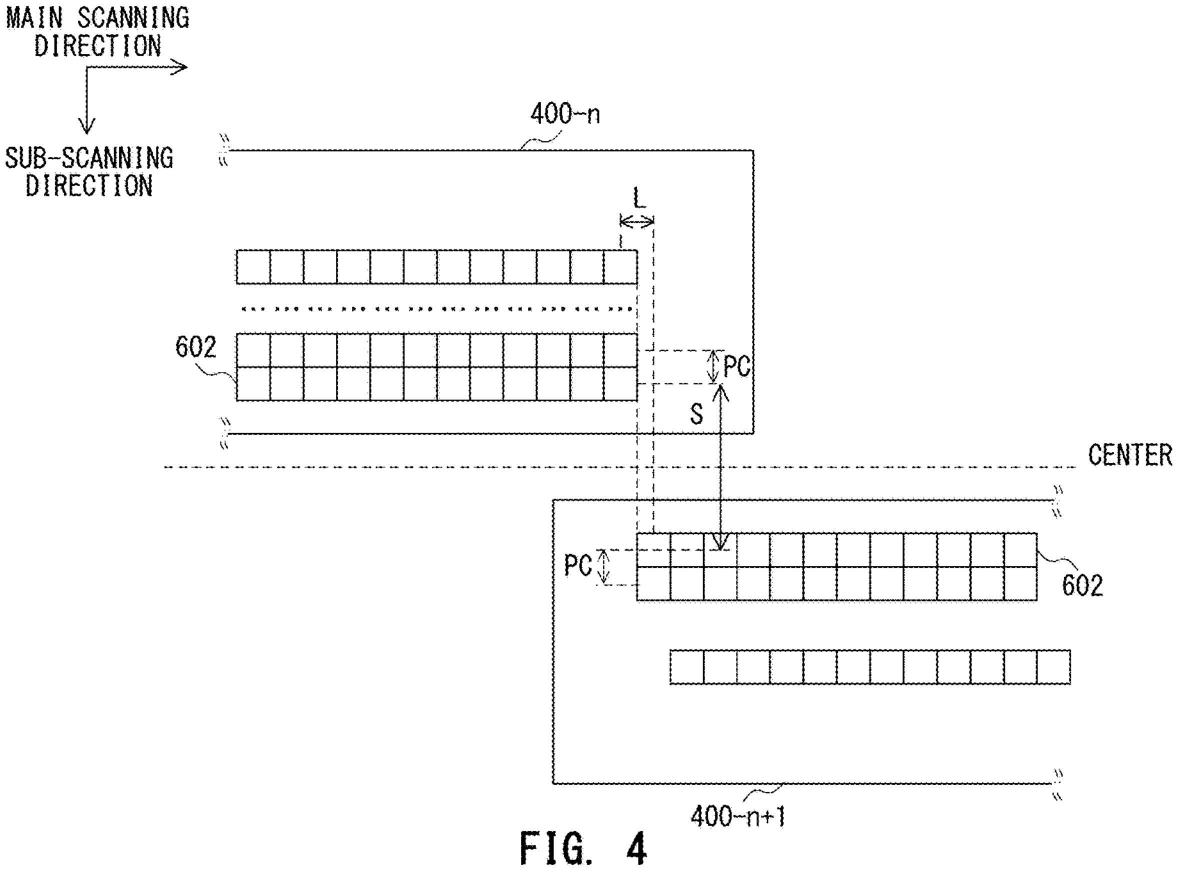
FIG. 4 is an explanatory diagram of light emitting chips.

For the convenience of description, a side on which branch numbers of the light emitting chips 400-1 to 400-20 arranged in the main scanning direction are smaller is hereinafter sometimes referred to as "left" and a side on which the branch numbers are larger is hereinafter sometimes referred to as "right." For example, the light emitting chip 400-1 is the light emitting chip 400 at a left end, and the light emitting chip 400-20 is the light emitting chip at a right end. In FIG. 4, two light emitting chips of a light emitting chip 400-*n* and a light emitting chip 400-*n*+1 at the right end are exemplified.

FIG. 4 is an explanatory diagram of the light emitting chips 400. The light-emitting element array 201 in the at least one embodiment includes, as a whole, the plurality of light emitting elements on N columns in the main scanning direction and on M rows in the sub-scanning direction. M and N are integers equal to or larger than 2. A number J (J=N/20) of light emitting elements 602 arranged on each row (main scanning direction) of one light emitting chip 400 is, for example, 748 (J=748). The number M of light emitting elements 602 arranged on each column (sub-scanning direction) of one light emitting chip 400 is, for example, 4 (M=4). That is, in the example in the at least one embodiment, the light emitting chip 400 includes a total of 2,992 (=748×4) light emitting elements 602, which are the 748 light emitting elements in the main scanning direction and the 4 light emitting elements in the sub-scanning direction.

A pitch PC between center points of the light emitting elements 602 next to each other in the sub-scanning direction is approximately 21.16 μm when the resolution is, for example, 1,200 dpi. A pitch between the center points of the light emitting elements 602 next to each other in the main scanning direction is similarly, for example, approximately 21.16 μm. In this case, the length of the 748 light emitting elements 602 is approximately 15.8 mm in the main scanning direction.

FIG. 4 shows, for the convenience of description, an example in which the light emitting elements 602 of each light emitting chip 400 are completely arranged in a grid pattern, but the M (=4) light emitting elements 602 on each column are actually arranged in a staircase pattern. This point is described later.

Figure 5:
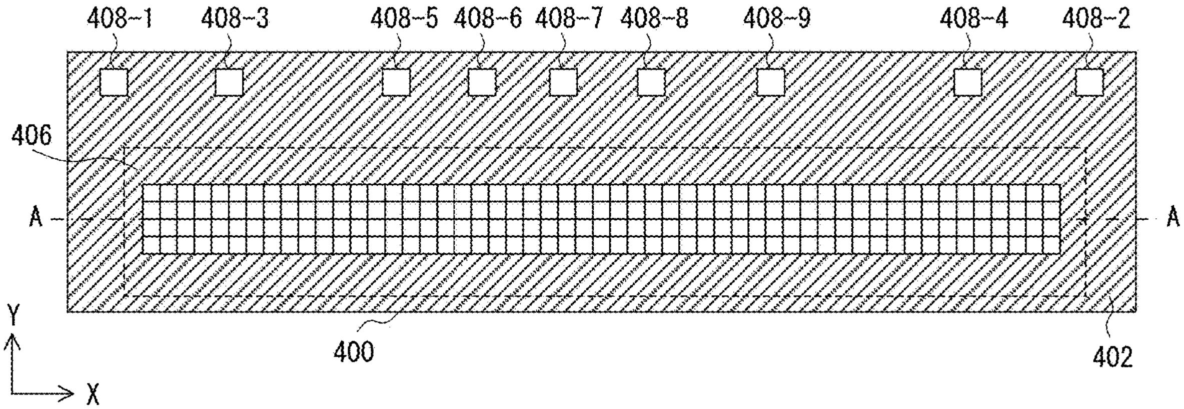
FIG. 5 is a plan view of a light emitting chip.

FIG. 5 is a plan view of the light emitting chip 400. The plurality of light emitting elements 602 are formed on a light emitting substrate 402 which is, for example, a silicon substrate. To the light emitting substrate 402, a circuit unit 406 which drives the plurality of light emitting elements 602 is mounted. To the light emitting substrate 402, there are provided pads 408-1 to 408-9 to which signal lines which are used to communicate to and from the image controller, a power supply line which is used to connect to a power supply, and a ground line which is used to ground are connected. The signal lines, the power supply line, and the ground line are wires containing, for example, Au as a material.

Figure 6:
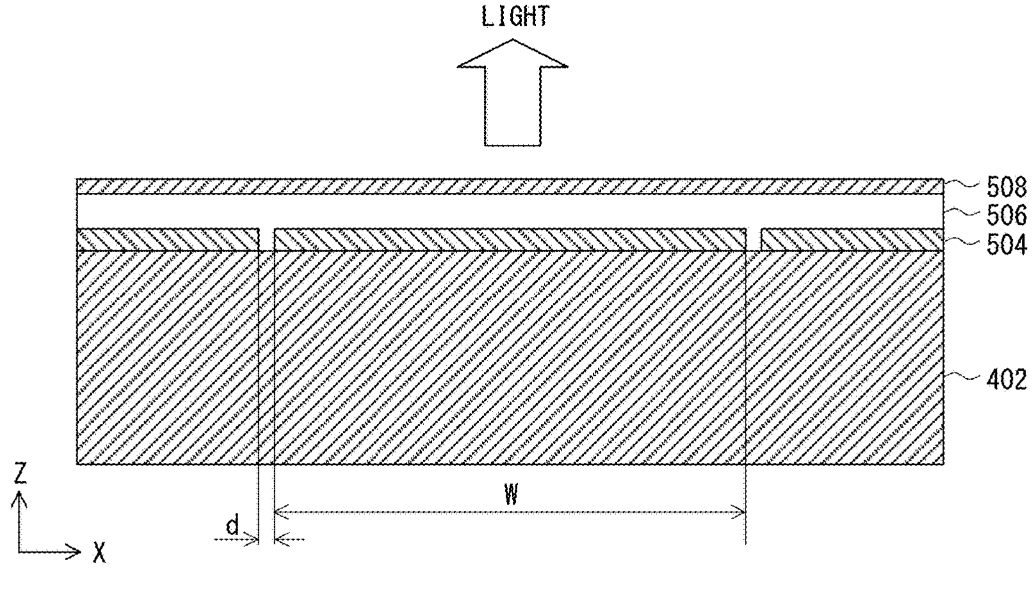
FIG. 6 is a cross-sectional view taken along the line A-A of FIG. 5.

FIG. 6 is a cross-sectional view taken along the line A-A of FIG. 5. On the light emitting substrate 402, a plurality of lower electrodes 504 are formed. Between two lower electrodes 504 next to each other, a gap having a length "d" is formed. A light emitting layer 506 is provided on the lower electrodes 504, and an upper electrode 508 is provided on the light emitting layer 506. The upper electrode 508 is one common electrode for the plurality of lower electrodes 504.

An electric potential difference is generated between the lower electrode 504 and the upper electrode 508, and hence a current flows from the lower electrode 504 to the upper electrode 508. As a result, the light emitting layer 506 emits light. Thus, one lower electrode 504 and a partial region of the light emitting layer 506 and the upper electrode 508 corresponding to this lower electrode 504 form one light emitting element 602. In the manner described above, the plurality of light emitting elements 602 are formed on the light emitting substrate 402.

As the light emitting layer 506, for example, an organic EL film is used. The upper electrode 508 is formed of a transparent electrode made of, for example, indium tin oxide (ITO) so as to transmit a wavelength (light emitting wavelength) of the light emitted from the light emitting layer 506. In the at least one embodiment, the entire upper electrode 508 transmits the light emitting wavelength of the light emitting layer 506, but the entire upper electrode 508 is not required to transmit the light emitting wavelength. Specifically, it is only required for a partial region through which the light from each light emitting element 602 passes to transmit the light emitting wavelength.

As the light emitting layer 506 in the at least one embodiment, one continuous light emitting layer 506 is formed, but a plurality of light emitting layers 506 each having a width equivalent to the width W of the lower electrode 504 may be formed in correspondence with the respective lower electrodes 504 thereon. Moreover, a first plurality of lower electrodes 504 out of the lower electrodes 504 of each light emitting chip 400 may be covered with a first light emitting layer 506, and a second plurality of lower electrodes 504 out of the lower electrodes 504 may be covered with a second light emitting layer 506.

Moreover, a first upper electrode 508 may be formed in common in correspondence with the first plurality of lower electrodes 504 out of the lower electrodes 504 of each light emitting chip 400, and a second upper electrode 508 may be formed in common in correspondence with the second plurality of lower electrodes 504 out of the lower electrodes 504. Also in this configuration, one lower electrode 504 and the region of the light emitting layer 506 and the upper electrode 508 corresponding to this lower electrode 504 form one light emitting element 602.

<Image Controller of Exposure Head>

Figure 7:
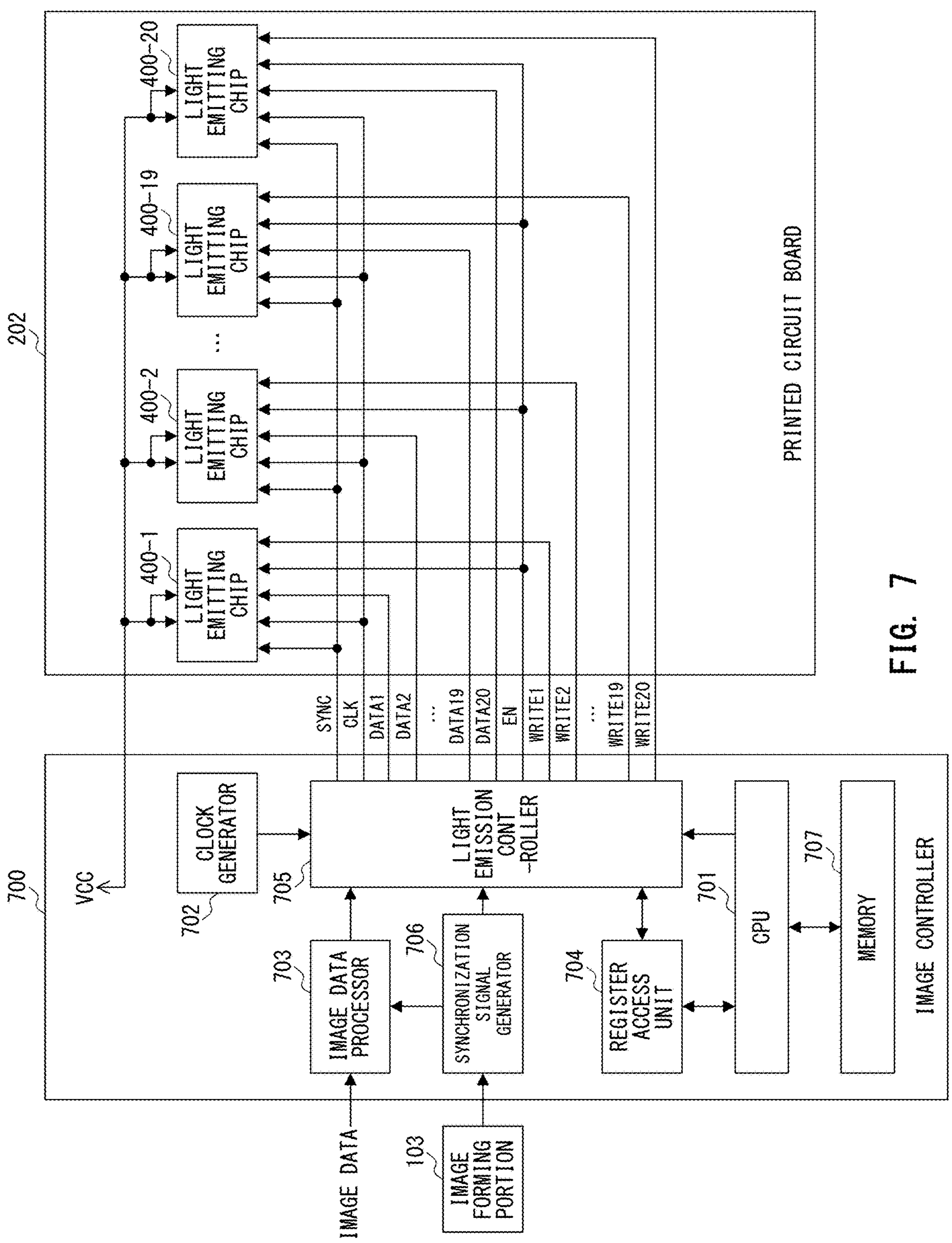
FIG. 7 is a configuration diagram of an image controller.

FIG. 7 is a configuration diagram of the image controller which controls turning on and turning off of the light emitting chips 400. An image controller 700 can communicate to and from the printed circuit board 202 via the plurality of signal lines (wires). The image controller 700 includes a central processing unit (CPU) 701, a clock generator 702, an image data processor 703, a register access unit 704, a light emission controller 705, a synchronization signal generator 706, and a memory 707. The image controller 700 is formed of at least one processor.

The light emission controller 705 forms an exposure device together with the exposure head 106. The light emission controller 705 terminates the signal lines to and from the printed circuit board 202. An n-th light emitting chip 400-*n* on the printed circuit board 202 is connected to the light emission controller 705 via a signal line DATAn and a signal line WRITEn. The signal line DATAn transmits the print image data from the image controller 700 to the light emitting chip 400-*n*. The signal line WRITEn is a signal line used by the image controller 700 to write control data to a register of the light emitting chip 400-*n*.

Between the light emission controller 705 and each light emitting chip 400, there are further provided one signal line CLK, one signal line SYNC, and one signal line EN. The signal line CLK transmits a clock signal used for the data transmission via the signal line DATAn and the signal line WRITEn. The clock generator 702 generates a reference clock signal, and transmits the generated reference clock signal to each component of the image controller 700. The light emission controller 705 transmits, to each light emitting chip 400 via the signal line CLK, a clock signal generated based on the reference clock signal acquired from the clock generator 702.

The synchronization signal generator 706 generates and outputs a synchronization signal synchronized with the reference clock signal acquired from the clock generator 702. The synchronization signal is a reference signal for an output timing of the print image data of an output unit in the image data processor 703, and serves as a reference signal for a timing for transmitting the print image data from the light emission controller 705 to each light emitting chip 400. The synchronization signal generator 706 generates, in order to output the print image data from the light emission controller 705 in cooperation with an image forming operation by the image forming portion 103, the synchronization signal based on an image forming operation start signal (referred to as "TOP signal" in the at least one embodiment) from the image forming portion 103.

The CPU 701 controls the operation of the entire image forming apparatus 1. The memory 707 stores various types of data used to control the operation of the entire image forming apparatus 1. For example, in the memory 707, profile information indicating unique characteristics of the image forming apparatus 1 is stored. The image data processor 703 executes predetermined image processing on the read image data acquired from the reading portion 100 or the image data for printing acquired from the external apparatus. The image data processor 703 executes the image processing, to thereby generate binary image data (print image data) used for the light emission control for the light emitting elements 602 of the light emitting chips 400 on the printed circuit board 202.

The image processing executed by the image data processor 703 includes, for example, raster conversion, tone correction, color conversion, and halftone processing. The image data processor 703 transmits the generated binary image data (print image data) to the light emission controller 705. The register access unit 704 receives, from the CPU 701, the control data to be written to the register in each light emitting chip 400, and transmits the received control data to the light emission controller 705.

The image forming apparatus 1 includes the exposure head 106 for each of the image forming units 101*a* to 101*d*. That is, in the at least one embodiment, four printed circuit boards 202 are provided. The image controller 700 is connected to those four printed circuit boards 202 and executes turning-on control for the plurality of light emitting elements 602 mounted to each of the four printed circuit boards 202.

Figure 8:
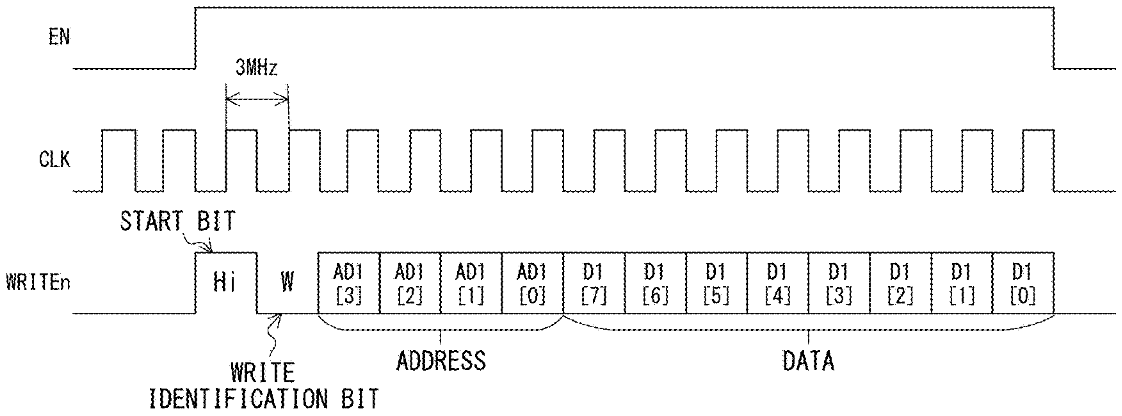
FIG. 8 is a timing chart in a case in which control data is to be written.

FIG. 8 is a timing chart in a case in which the control data is written to the register of each light emitting chip 400. FIG. 8 shows a transition of a signal level of each signal line in the case in which the control data is to be written to the register of the light emitting chip 400. To the signal line EN, an enable signal which rises to a high level to indicate ongoing communication is transmitted during the communication. The light emission controller 705 transmits a start bit to the signal line WRITEn in synchronism with the rise of the enable signal. After that, the light emission controller 705 transmits a write identification bit indicating the write operation to the signal line WRITEn, and then transmits an address (here, 4 bits) of the register to which the control data is to be written and the control data (here, 8 bits). The light emission controller 705 sets a frequency of the clock signal transmitted via the signal line CLK to, for example, 3 MHz at the time of the write to the register.

Figure 9:
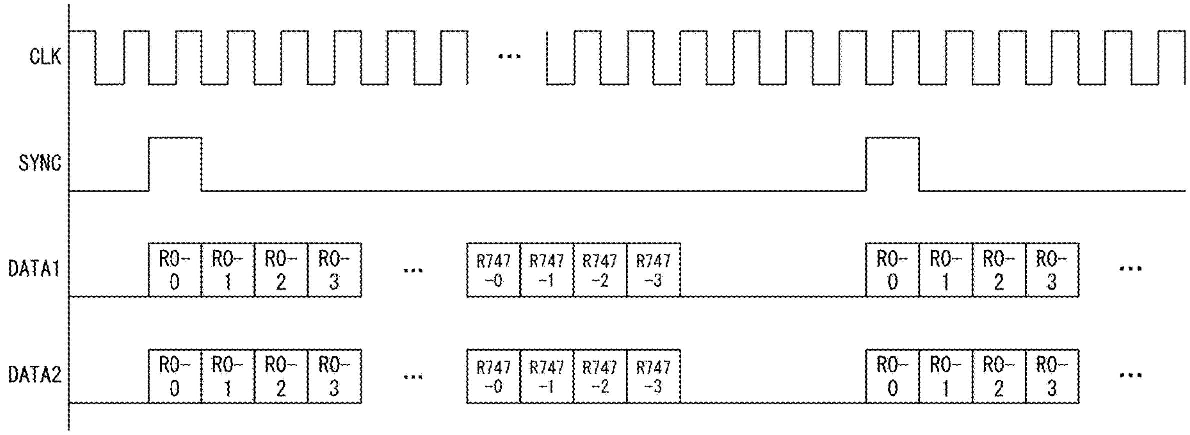
FIG. 9 is a timing chart at the time of transmission of print image data.

FIG. 9 is a timing chart at the time of the transmission of the print image data to each light emitting chip 400, and exemplifies a transition of the signal level of each signal line. To the signal line SYNC, a cyclic line synchronization signal indicating an exposure timing of each line in the photosensitive member 102 is transmitted. When a circumferential speed of the photosensitive member 102 is 200 mm/s and a resolution in the circumferential direction is 1,200 dpi (approximately 21.16 μm), the line synchronization signal is output at a cycle of approximately 105.8 μs.

The light emission controller 705 transmits, in synchronism with the rise of the line synchronization signal, the print image data via signal lines DATA1 to DATA20. Each light emitting chip 400 in the at least one embodiment includes the 2,992 light emitting elements 602, and hence it is required to transmit, to each light emitting chip 400, the print image data used to control the light emission (turning-on) of each of the 2,992 light emitting elements 602 within the cycle of approximately 105.8 μs. Thus, in the at least one embodiment, as illustrated in FIG. 9, at the time of the transmission of the print image data, the light emission controller 705 sets the frequency of the clock signal transmitted via the signal line CLK to 30 MHz.

Figure 10:
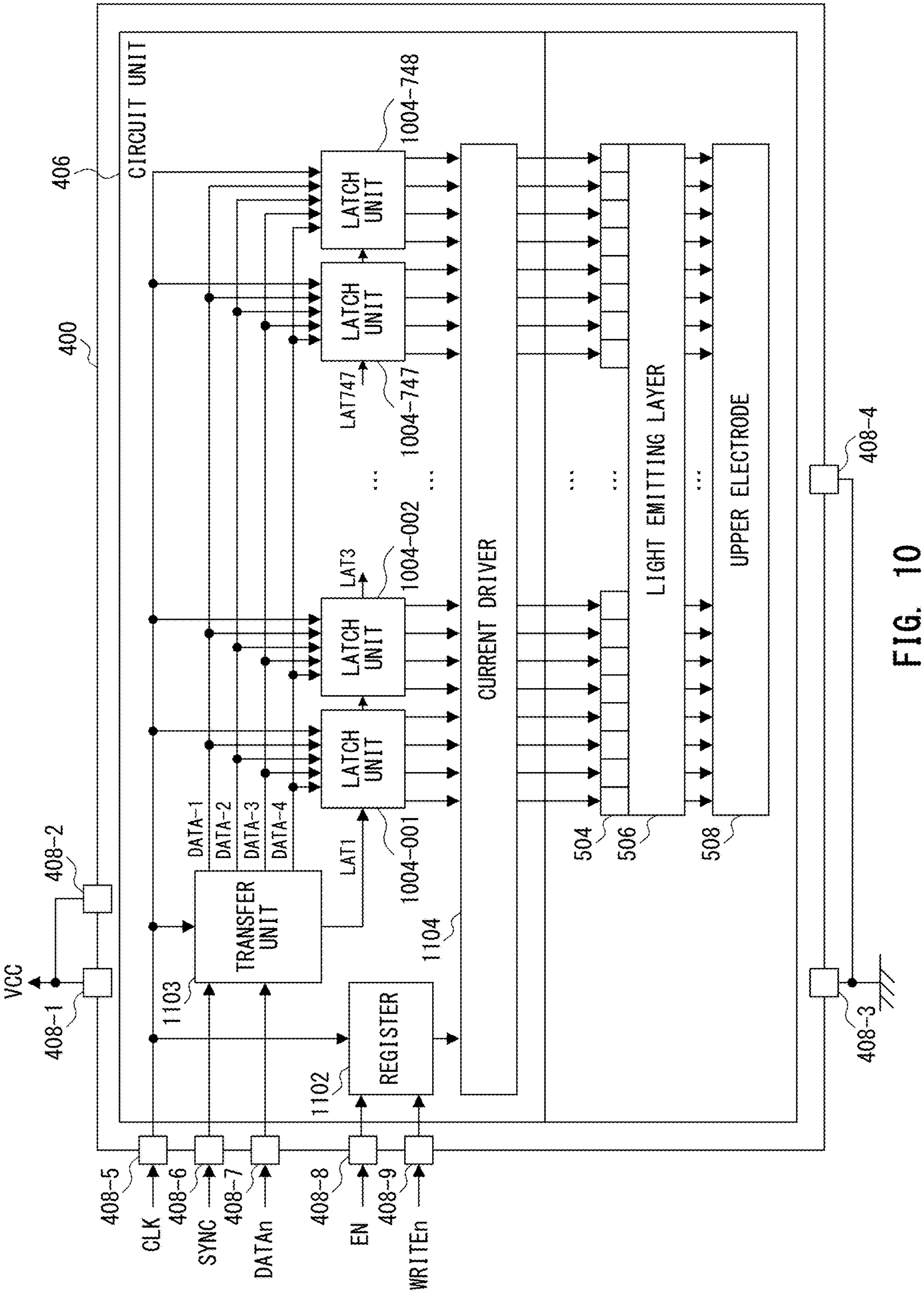
FIG. 10 is a detailed functional configuration diagram of one light emitting chip.

FIG. 10 is a detailed functional configuration diagram of one light emitting chip 400 (n-th light emitting chip 400-*n*). The circuit unit 406 includes a register 1102, a transfer unit 1103, latch units 1004-001 to 1004-748 and a current driver 1104.

As described with reference to FIG. 5, the light emitting chip 400 includes the nine pads 408-1 to 408-9. To the pad 408-1 and the pad 408-2, a power supply voltage VCC is applied via the power supply line. To each portion of the circuit unit 406 of the light emitting chip 400, the power supply voltage VCC is applied via the pad 408-1 and the pad 408-2. The pad 408-3 and the pad 408-4 are grounded via the ground line. Each portion of the circuit unit 406 and the upper electrode 508 are grounded via the pad 408-3 and the pad 408-4.

To the pad 408-5, the signal line CLK is connected. The signal line CLK is connected to the transfer unit 1103, the register 1102, and the latch units 1004-001 to 1004-748 via the pad 408-5. To the pad 408-6, the signal line SYNC is connected. To the pad 408-7, the signal line DATAn is connected. The signal line SYNC and the signal line DATAn are connected to the transfer unit 1103 via the pad 408-6 and the pad 408-7, respectively. To the pad 408-8, the signal line EN is connected. To the pad 408-9, the signal line WRITEn is connected. The signal line EN and the signal line WRITEn are connected to the register 1102 via the pad 408-8 and the pad 408-9, respectively. In the register 1102, for example, control data indicating a light emission intensity of the light emitting element 602 is stored.

The transfer unit 1103 uses, as a start point, the line synchronization signal acquired from the signal line SYNC, to acquire, in synchronism with the clock signal acquired from the signal line CLK, from the signal line DATAn, the print image data including a series of pixel values each indicating the turning-on or the turning-off of one light emitting element 602. The transfer unit 1103 performs serial-parallel conversion on the series of pixel values serially acquired from the signal line DATAn in units of M (for example, M=4) pixel values.

For example, the transfer unit 1103 includes four cascade-connected D flip-flops. The transfer unit 1103 parallelizes pixel values DATA-1, DATA-2, DATA-3, and DATA-4 input during the four clocks and sequentially transmits the parallelized pixel values to the latch unit 1004-001 to 1004-748. Moreover, the transfer unit 1103 further includes four D flip-flops used to delay the line synchronization signal. The transfer unit 1103 outputs a first latch signal to the latch unit 1004-001 via a signal line LAT1 at a timing delayed by four clocks from the input of the line synchronization signal. The first latch signal is a signal obtained by, for example, delaying the line synchronization signal by the four clocks.

The k-th latch unit 1004-*k* ("k" is an integer of from 1 to 748) latches the four pixel values DATA-1, DATA-2, DATA-3, and DATA-4 input from the transfer unit 1103 simultaneously with the input of the k-th latch signal. Except for the last latch unit 1004-748, the k-th latch unit 1004-*k* delays the k-th latch signal by the amount corresponding to the four clocks and outputs the (k+1)-th latch signal to the latch unit 1004-(*k*+1) via the signal line LAT (k+1). The k-th latch unit 1004-*k* continues to output, to the current driver 1104, the drive signal based on the four latched pixel values during the signal cycle of the k-th latch signal.

For example, between the timing at which the first latch signal is input to the latch unit 1004-001 and the timing at which the second latch signal is input to the latch unit 1004-002, there exists a delay corresponding to the four clocks. Thus, while the latch unit 1004-001 outputs the drive signal based on the first to fourth pixel values to the current driver 1104, the latch unit 1004-002 outputs the drive signal based on the fifth to eighth pixel values to the current driver 1104.

Generally speaking, the latch unit 1004-*k* outputs the drive signal based on the (4k−3)-th to (4k)-th pixel values to the current driver 1104. Thus, in FIG. 10, the 2,992 drive signals used to control the drive of the 2,992 (=748×4) light emitting elements 602 are output, to the current driver 1104, by the 748 latch units 1004-001 to 1004-748 substantially in parallel. Each drive signal is a binary signal indicating a low level or a high level.

The current driver 1104 includes 2,992 light emission drive circuits corresponding to the respective 2,992 light emitting elements 602 including the partial regions of the light emitting layer 506. Each light emission drive circuit applies a drive voltage corresponding to the light emission intensity indicated by the control data in the register 1102 to the light emitting layer 506 of the corresponding light emitting element 602 during a period in which the drive signal is at the high level implying ON (turning on) of the light emitting element 602. As a result, the current flows through the light emitting layer 506, resulting in the light emission of the light emitting element 602. The control data may indicate one individual light emission intensity for each light emitting element 602, may indicate one light emission intensity for each group of the light emitting elements 602, or may indicate one light emission intensity common to all of the light emitting elements 602.

<Multiple-Exposure Control>

Figure 11:
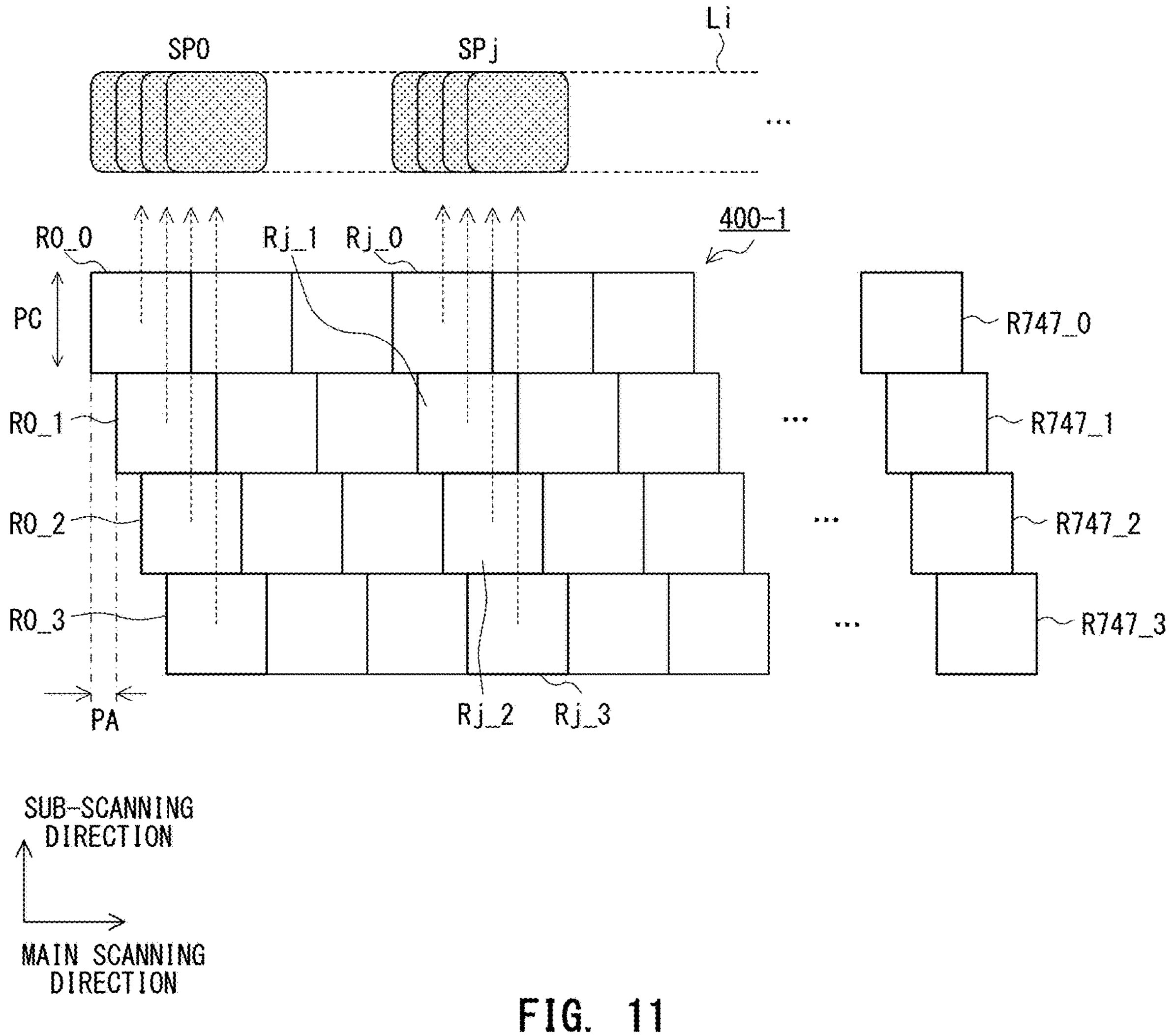
FIG. 11 is an explanatory diagram of a multiple-exposure.
Figure 12A:
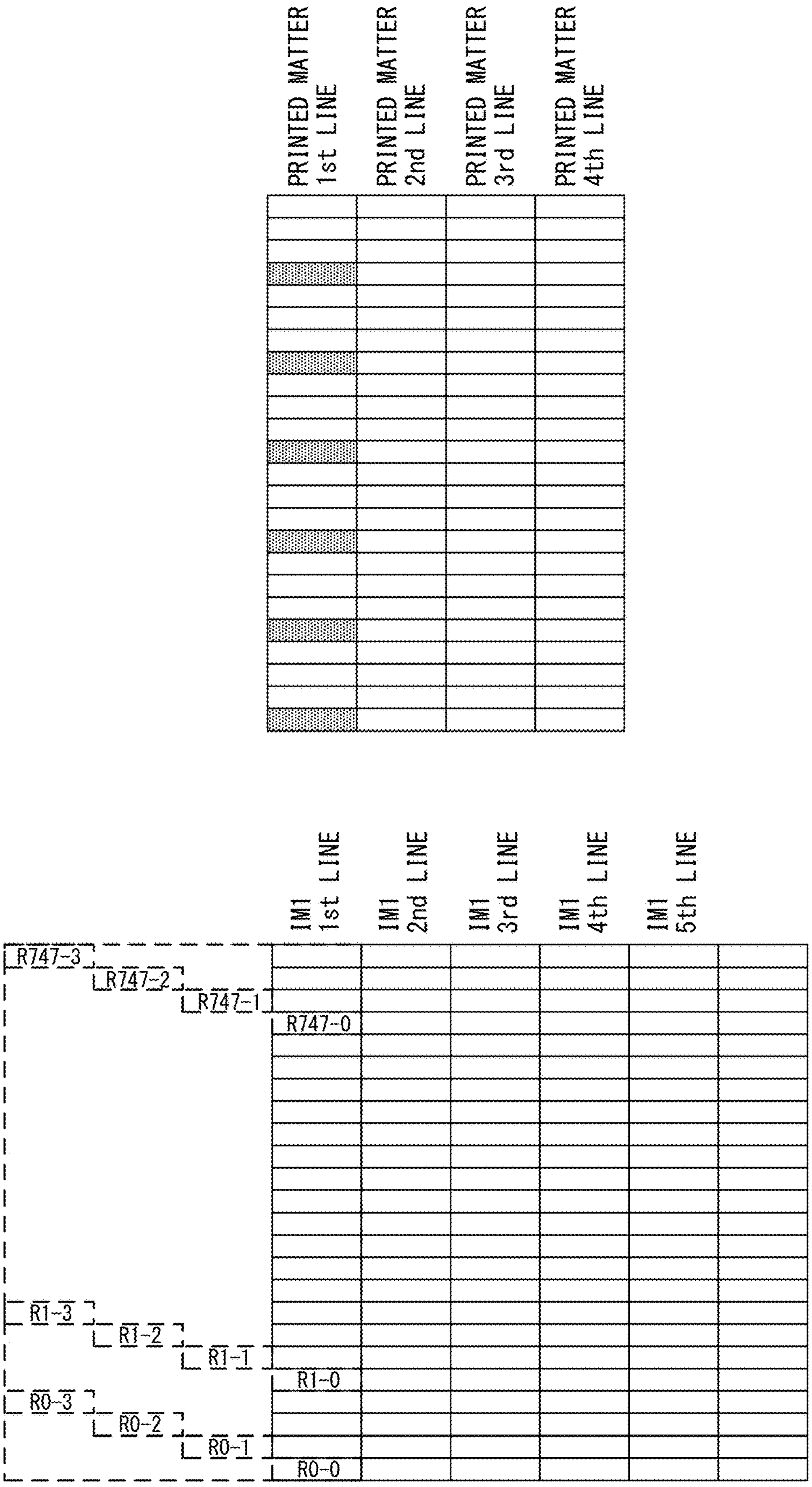
FIG. 12A and FIG. 12B are explanatory diagrams of output control of a light emission controller.
Figure 12B:
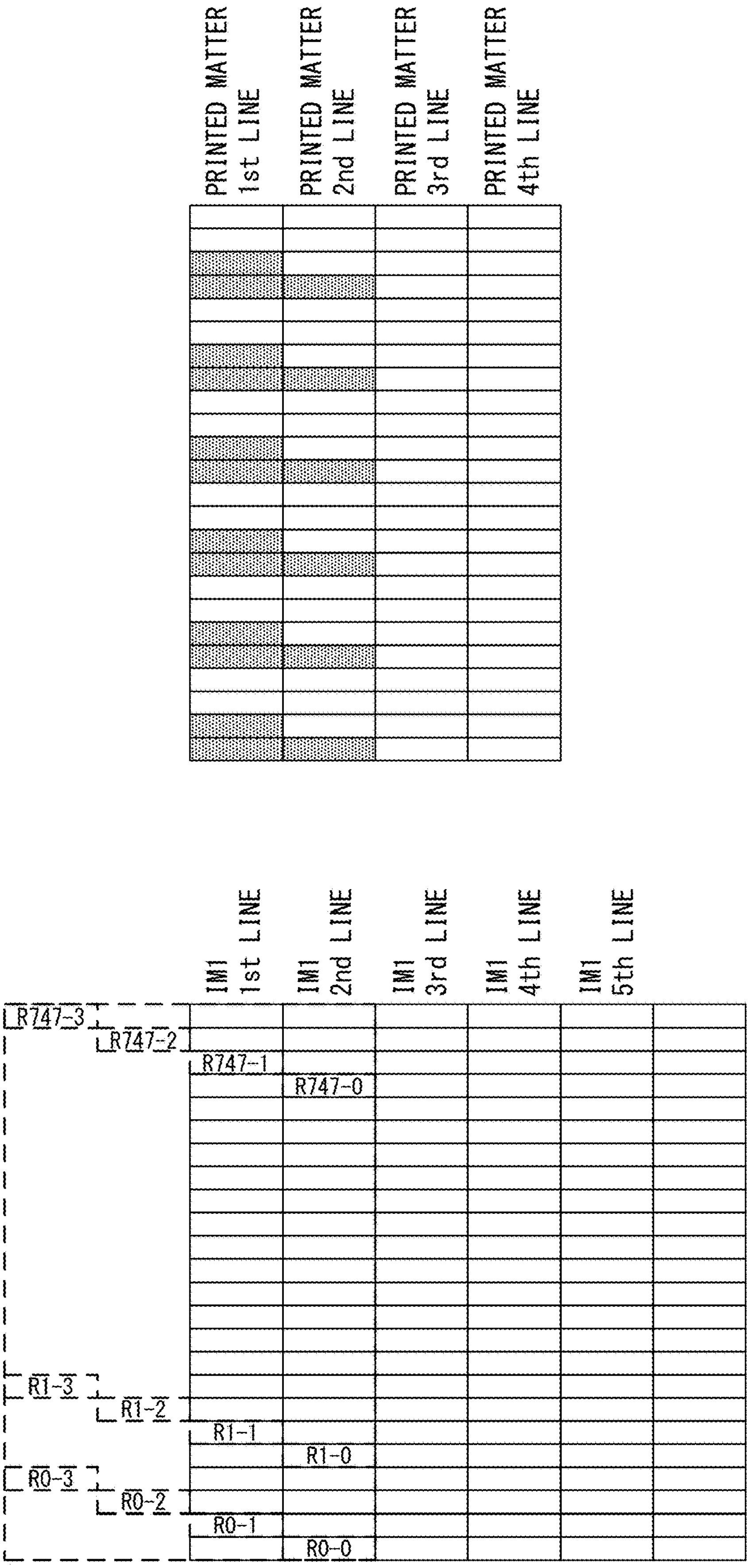
Figure 13A:
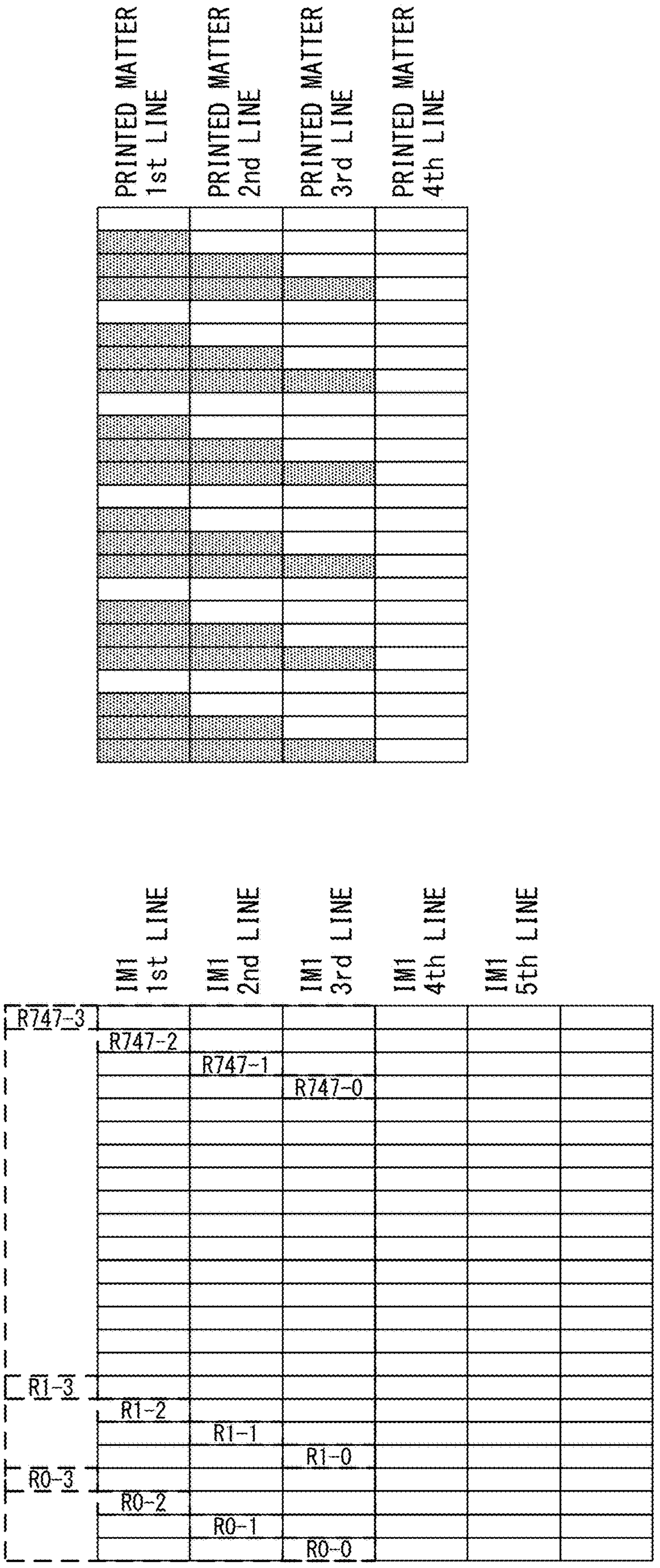
FIG. 13A and FIG. 13B are explanatory diagrams of the output control of the light emission controller.
Figure 13B:
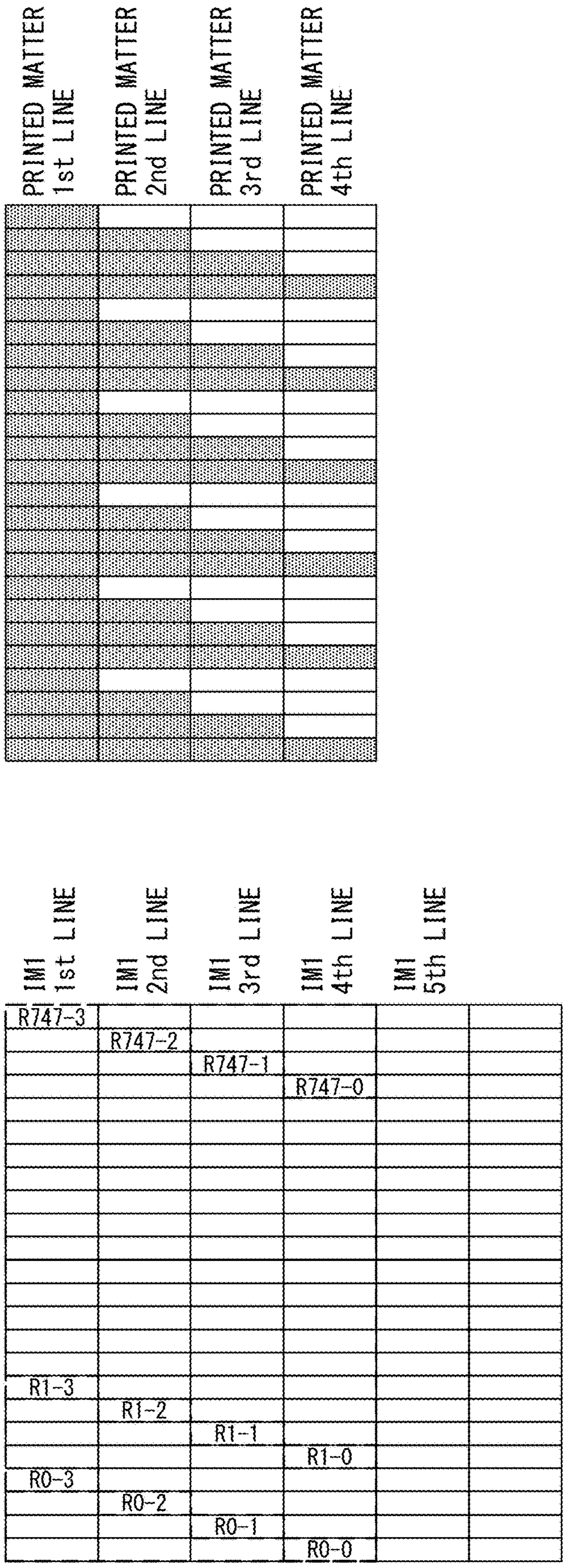

FIG. 4 shows the example in which the light emitting elements 602 of each light emitting chips 400 are arranged in a grid pattern, but the M light emitting elements 602 on each column are actually arranged in a staircase pattern at a fixed pitch. FIG. 11 is an explanatory diagram of multiple exposure by the light emitting elements 602 arranged in a staircase pattern. In FIG. 11, an arrangement of the light emitting elements 602 of the light emitting chip 400-1 in the case in which M=4 is partially exemplified.

Rj_m (j={0, 1, . . . , 747} and m={0, 1, 2, 3}) indicates the light emitting element 602 on the j-th column from the left in the main scanning direction and on the m-th row from the top in the sub-scanning direction. A pitch PC of the light emitting element in the sub-scanning direction is determined by the size of the light emitting element 602, and is, for example, approximately 21.16 μm as described above. A pitch of the two light emitting elements next to each other out of the M light emitting elements on each column in the main scanning direction, that is, a pitch PA of the light emitting elements 602 in the main scanning direction is approximately 5 μm in a case of, for example, a resolution of 4,800 dpi.

As a result of arranging the four light emitting elements 602 on each column in a staircase pattern as described above, any two light emitting elements 602 next to each other out of those four light emitting elements 602 have a partially overlapping range in the main scanning direction. The four light emitting elements 602 on the column corresponding to each pixel position of the print image data sequentially emit the light while the photosensitive member 102 is rotating, resulting in a spot corresponding to each pixel position being formed on the surface of the photosensitive member 102.

In the example of FIG. 11, when the pixel value at the left end on an i-th line of the print image data specifies turning on (ON), the light emitting elements R0_0, R0_1, R0_2, and R0_3 sequentially emit the light at the timings at which those light emitting elements oppose the line Li on the surface of the photosensitive member 102. As a result, a spot region at the left end of the line Li is subjected to the multiple exposure, resulting in formation of a spot SP0. Similarly, when a j-th pixel value from the left on the i-th line of the print image data specifies turning on (ON), the light emitting elements Rj_0, Rj_1, Rj_2, and Rj_3 sequentially emit the light at the timings at which those light emitting elements oppose the line Li on the surface of the photosensitive member 102. As a result, a j-th spot region from the left of the line Li is subjected to the multiple exposure, resulting in formation of a corresponding spot SPj.

As described above, in the at least one embodiment, the light emitting elements on the two columns next to each other in the main scanning direction occupy the ranges partially overlapping in the main scanning direction. Similarly, out of the two light emitting chips 400 next to each other in the main scanning direction, the light emitting elements on the right end column of the left light emitting chip 400 and the light emitting elements on the left end column of the right light emitting chip 400 also occupy ranges partially overlapping in the main scanning direction (see FIG. 3B).

For the entire 20 light emitting chips 400, the pitch PA of the light emitting elements 602 in the main scanning direction is constant (approximately 5 μm). The four light emitting elements on each column of those light emitting chips 400 sequentially emit light at appropriate timings, resulting in formation of a smooth line of the electrostatic latent image formed of a series of spots partially overlapping each other at a constant pitch on the surface of the photosensitive member 102. Such a line is continuously formed in the sub-scanning direction, resulting in formation of a two-dimensional electrostatic latent image on the surface of the photosensitive member 102.

Figure 14:
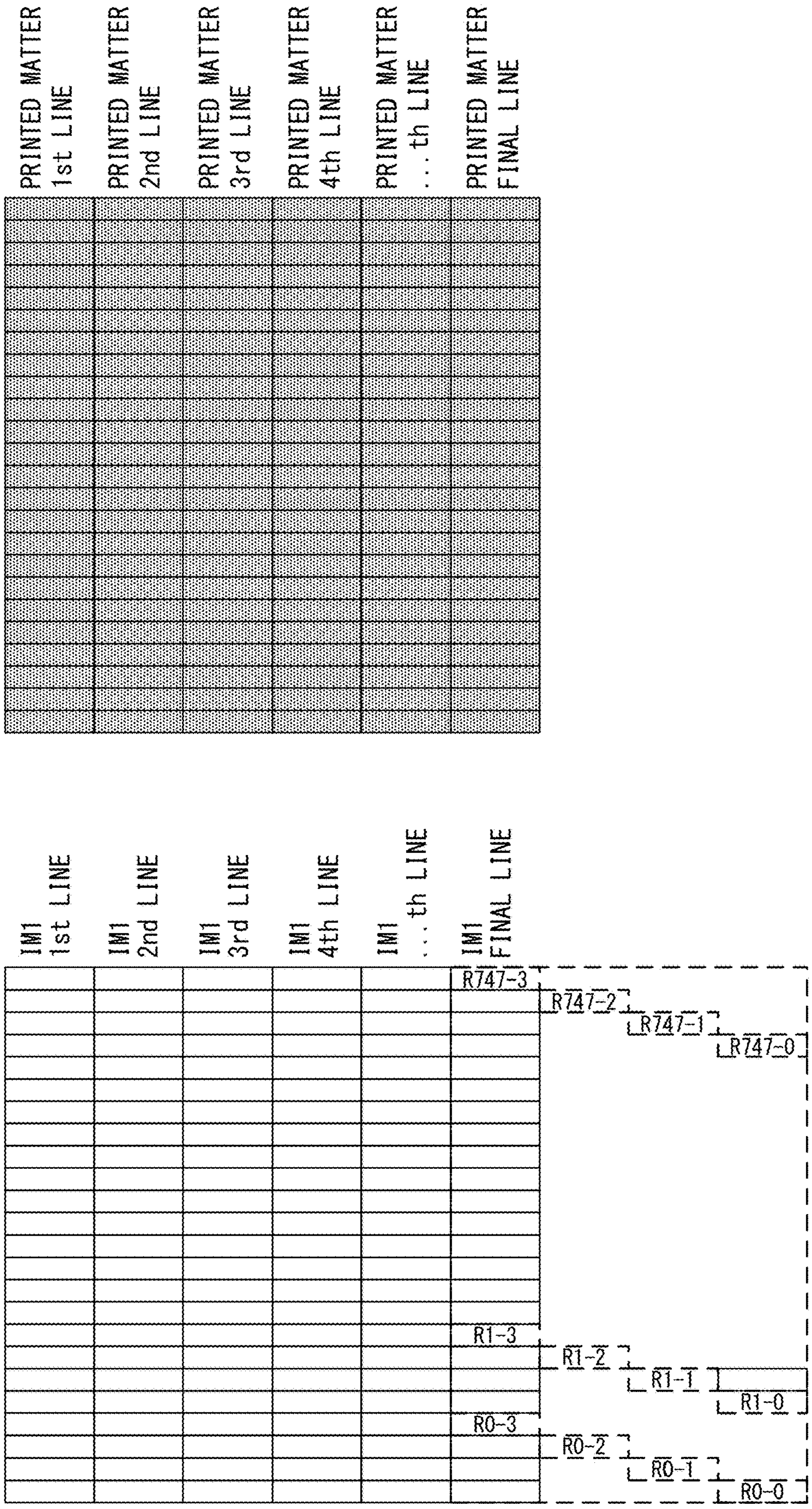
FIG. 14 is an explanatory diagram of the output control of the light emission controller.

FIG. 12A and FIG. 12B, FIG. 13A and FIG. 13B, and FIG. 14 are explanatory diagrams of output control of the light emission controller 705 based on the print image data. Each of FIG. 12A and FIG. 12B and FIG. 13A and FIG. 13B shows a case in which the line synchronization signal illustrated in FIG. 9 is received four times from a start line of the print image data IM1. FIG. 14 shows a case in which the line synchronization signal for outputting the last line of the print image data IM1 is received.

In a left diagram of each of FIG. 12A, FIG. 12B, FIG. 13A, and FIG. 14, an order of the reading of the print image data IM1 by the light emission controller 705 is illustrated in broken lines. Rj-m in the broken lines indicates the print image data to be output to the light emitting element illustrated in FIG. 11. The order of the output of the print image data is as illustrated in the timing chart of FIG. 9. The light emission controller 705 sequentially outputs print image data in the following order: R0-0→R0-1→R0-2→R0-3→R1-0→R1-1.

In a right diagram of each of FIG. 12A, FIG. 12B, FIG. 13A, and FIG. 14, there is illustrated a printed matter printed by the light emission controller 705 transmitting the image on the first line to the fourth line at a start portion of the print image data IM1 to the exposure head 106, and there is illustrated a state in which the image is printed as an effective image. Hatched portions indicate a state in which the image corresponding to the print image data IM1 is actually printed. In the right diagram of each of FIG. 12A, FIG. 12B, FIG. 13A, and FIG. 14, it is indicated that the image for one line is formed by the light emission controller 705 receiving the line synchronization signal four times.

In FIG. 12A, FIG. 12B, FIG. 13A, and FIG. 14, there exist portions in which the print image data IM1 to be output to the light emitting element Rj_m does not exist. The light emission controller 705 outputs "0" indicating "turning off" when the print image data IM1 corresponding to the image to be output does not exist.

<Image Data Processor>

Figure 15:
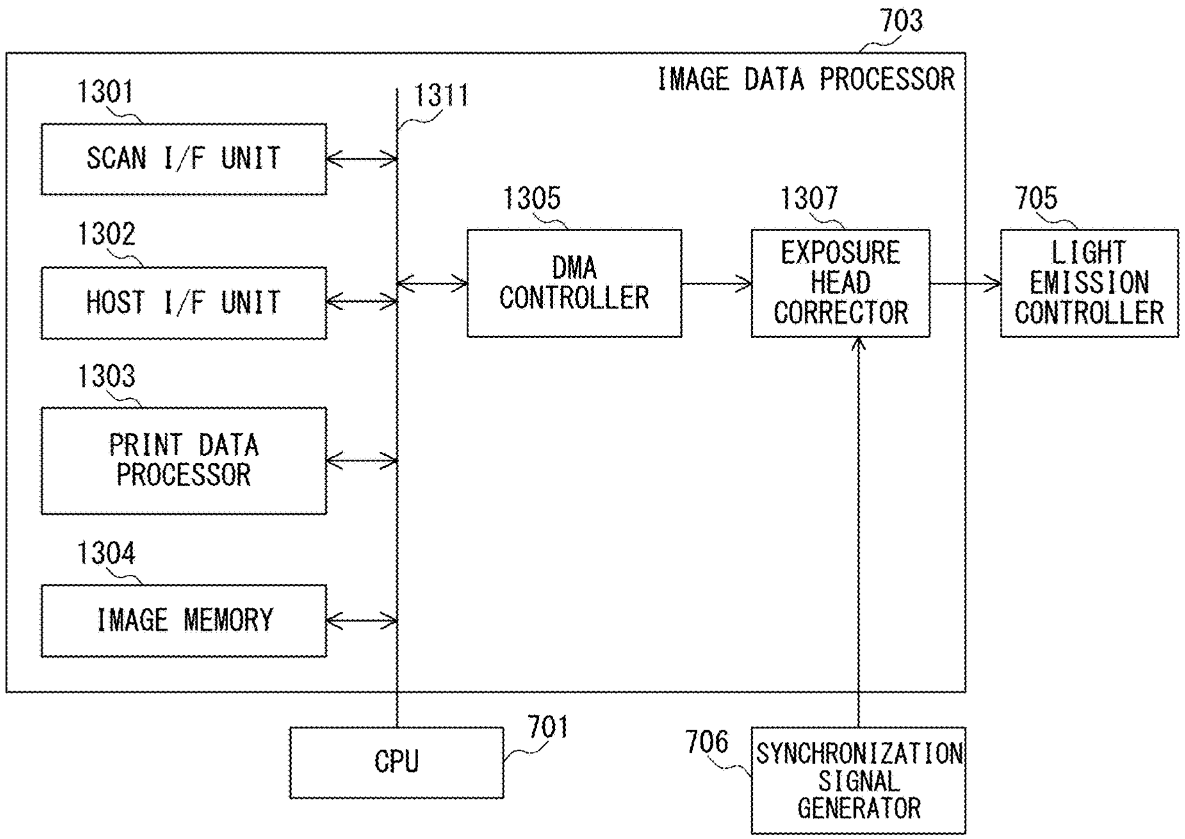
FIG. 15 is a configuration diagram of an image data processor.

FIG. 15 is a configuration diagram of the image data processor 703. As described above, the image data processor 703 operates in synchronism with the synchronization signal input from the synchronization signal generator 706, and executes the processing corresponding to the control of the CPU 701 on the image data. The image data processor 703 includes a scan I/F unit 1301, a host I/F unit 1302, a print data processor 1303, an image memory 1304, a direct memory access (DMA) controller 1305, and an exposure head corrector 1307. The scan I/F unit 1301, the host I/F unit 1302, the print data processor 1303, the image memory 1304, and the DMA controller 1305 are connected to one another for communication via a bus 1311. The bus 1311 includes an address bus and a data bus. The exposure head corrector 1307 is connected to the DMA controller 1305.

The scan I/F unit 1301 is an interface which acquires the read image data from the reading portion 100. The scan I/F unit 1301 executes predetermined processing on the acquired read image data, and transmits the resultant read image data to the print data processor 1303. The read image data obtained after the predetermined processing is multi-valued bitmap data.

The host I/F unit 1302 is an interface which acquires the image data for printing from the external apparatus. The image data for printing is, for example, page description language (PDL) data. The host I/F unit 1302 executes predetermined processing on the image data for printing to generate multi-valued bitmap data, and transmits the multi-valued bitmap data to the print data processor 1303.

The print data processor 1303 executes quantization processing such as pseudo-gradation processing and error diffusion which use a dither pattern on the multi-valued bitmap data acquired from the scan I/F unit 1301 or the host I/F unit 1302. The print data processor 1303 uses the quantization processing to generate binary image data for the image formation from the bitmap data in the image forming portion 103. An image indicated by the binary image data has a resolution of, for example, 4,800 dpi in the main scanning direction and 1,200 dpi in the sub-scanning direction.

The print data processor 1303 stores the generated binary image data in the image memory 1304. The binary image data stored in the image memory 1304 is subjected to read control by the DMA controller 1305. The read control for the binary image data by the DMA controller 1305 is executed in response to an instruction from the CPU 701. The DMA controller 1305 sequentially transmits the binary image data read out from the image memory 1304 to the exposure head corrector 1307.

The exposure head corrector 1307 makes, in accordance with characteristics of the exposure head 106, digital correction for the binary image data acquired from the DMA controller 1305. The exposure head corrector 1307 uses the digital correction to suppress influence of manufacturing variation of each component in the exposure head 106 such as differences in light amount among the rod lens array 203 and the light emitting chips 400-1 to 400-20. The exposure head corrector 1307 transmits the binary image data obtained after the correction to the light emission controller 705 in synchronism with the synchronization signal acquired from the synchronization signal generator 706.

Figure 16:
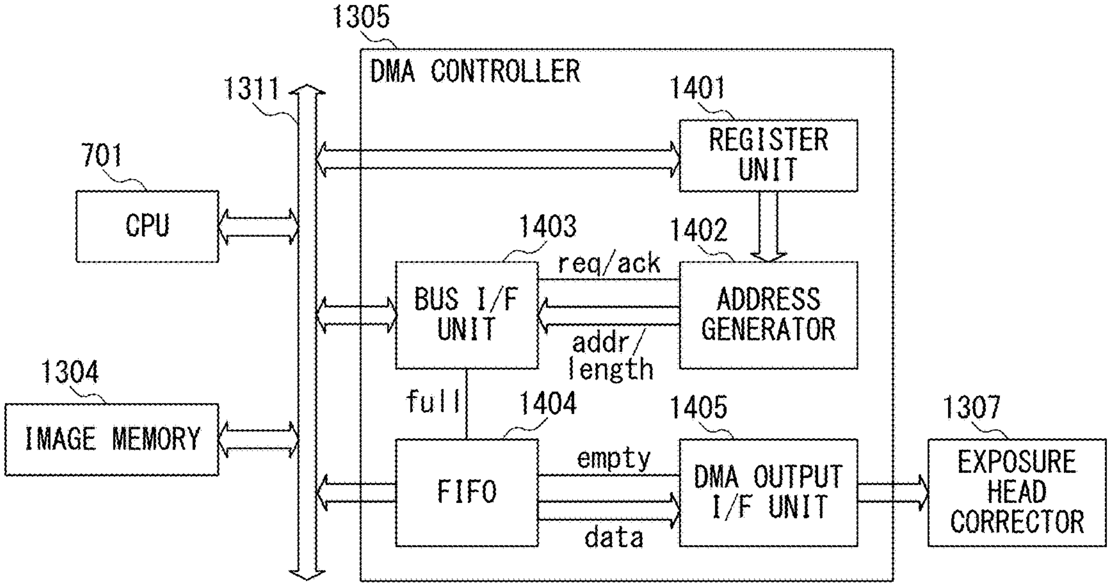
FIG. 16 is a detailed configuration diagram of a DMA controller.

FIG. 16 is a detailed configuration diagram of the DMA controller 1305. The DMA controller 1305 includes a register unit 1401, an address generator 1402, a bus I/F unit 1403, a first-in first-out (FIFO) 1404, and a DMA output I/F unit 1405.

The register unit 1401 includes a plurality of registers. An instruction from the CPU 701 to the DMA controller 1305 is executed by writing an appropriate value in each register of the register unit 1401. The address generator 1402 generates an address signal indicating an address for reading out the binary image data from the image memory 1304 based on the value set for each register of the register unit 1401. The address generator 1402 transmits, to the bus I/F unit 1403, an address signal (addr) and a length signal (length) indicating a length to be read out starting from this address in response to a request signal (req) transmitted from the bus I/F unit 1403.

The bus I/F unit 1403 is an interface used to access to the image memory 1304 via the bus 1311. The bus I/F unit 1403 acquires the address signal and the length signal from the address generator 1402, and issues a read transaction to the bus 1311. For example, when a data bus width of the bus 1311 is 32 bits, the bus I/F unit 1403 decomposes the address signal and the length signal into the 32-bit signal, and issues a read transaction. The read transaction is transmitted to the image memory 1304 via the bus 1311.

The bus I/F unit 1403 uses a response signal (ack) to notify the address generator 1402 of the processing completion when the processing for one set of the address signal and the length signal is completed. The address generator 1402, which has received the response signal, waits for a next request signal from the bus I/F unit 1403. The image memory 1304 transmits, in response to the address signal and the length signal specified by the read transaction, to the bus I/F unit 1403, the binary image data from, as the start, the address specified by the address signal to an address positioned at the length specified by the length signal.

The bus I/F unit 1403 temporarily stores the binary image data read out from the image memory 1304 in the FIFO 1404. The DMA controller 1305 stores the binary image data in the FIFO 1404, to thereby be able to wait, even when there occurs a period in which the exposure head corrector 1307 is temporarily unable to acquire the data, until the exposure head corrector 1307 comes to be able to acquire the data. As a result, when the exposure head corrector 1307 comes to be able to acquire the data, the binary image data can immediately be transmitted from the FIFO 1404 to the exposure head corrector 1307.

The FIFO 1404 transmits, when an available storage area for storing the data does not exist (full state) in the bus I/F unit 1403, a FIFO full signal (full) indicating that the available storage area does not exist. The bus I/F unit 1403 monitors the FIFO full signal output from the FIFO 1404. The bus I/F unit 1403 does not issue the read transaction when the FIFO 1404 is in the full state, and waits until the full state disappears.

The DMA output I/F unit 1405 is an interface used to transmit the binary image data stored in the FIFO 1404 to the exposure head corrector 1307. When the binary image data is not stored in the FIFO 1404, the FIFO 1404 transmits a FIFO empty signal (empty) indicating the binary image data does not exist to the DMA output I/F unit 1405. The DMA output I/F unit 1405 monitors the FIFO empty signal output from the FIFO 1404.

The DMA output I/F unit 1405 reads out, when the FIFO 1404 is not in the empty state and the exposure head corrector 1307 is in the state in which the exposure head corrector 1307 can acquire the data, the binary image data (data) from the FIFO 1404, and transmits the read binary image data to the exposure head corrector 1307. The DMA controller 1305 sometimes reads out, from the image memory 1304, the binary image data to be actually used in an overlapping manner (corresponding to reading twice). In this case, the DMA output I/F unit 1405 can discard the binary image data read out in an overlapping manner in accordance with whether or not the binary image data read out in an overlapping manner is used in post-stage processing (here, the exposure head corrector 1307).

<Misregistration>

The exposure head 106 is sometimes mounted to a position displaced from an ideal position with respect to the photosensitive member 102. In the exposure head 106, the printed circuit board 202 is sometimes mounted at a position displaced from an ideal position. Those displacements cause a displacement of an exposure position at the time when the photosensitive member 102 is exposed in the main scanning direction. The displacement of the exposure position occurs in the sub-scanning direction. The displacement of the exposure position causes a positional displacement of the formed image, resulting in a decrease in image quality. This displacement of the exposure position is referred to as "misregistration."

Figure 17:
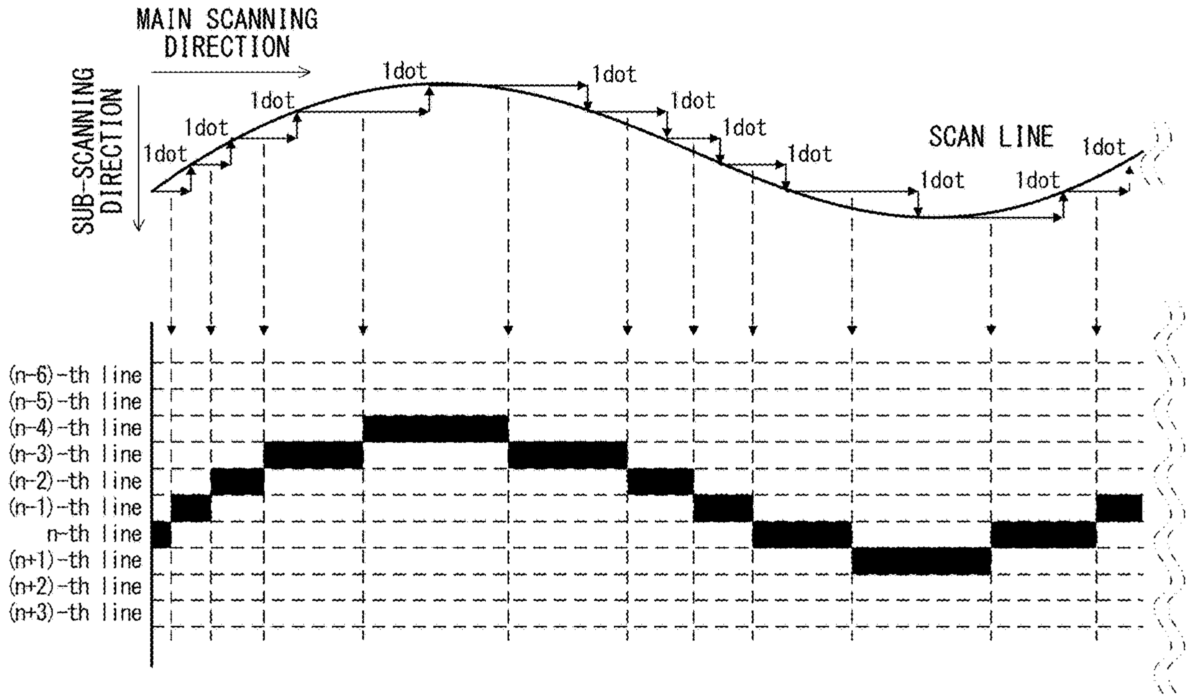
FIG. 17 is an explanatory diagram of misregistration.

FIG. 17 is an explanatory diagram of the misregistration. The photosensitive member 102 is ideally exposed in a straight line form in the main scanning direction by the exposure head 106. The position of exposure in a straight line form by the exposure head 106 is referred to as "scan line". An upper graph of FIG. 17 shows a state in which the scan line is curved in the sub-scanning direction due to the misregistration. This misregistration is detected by inspecting the characteristics of the image forming apparatus 1 at the time of, for example, the manufacturing of the image forming apparatus 1. For example, the misregistration is detected by forming various images on a sheet by the image forming apparatus 1. The detected misregistration is stored in the memory 707 as, for example, one piece of profile information on the image forming apparatus 1.

As described above, the binary image data is transmitted from the image data processor 703 to the light emission controller 705. At this time, the image data processor 703 divides one line in the main scanning direction into the plurality of segments, and transmits the binary image data for each segment. The above-mentioned address signal and length signal specify the binary image data for, for example, each segment. In the at least one embodiment, the binary image data is transmitted from the image data processor 703 to the light emission controller 705 while the line is switched for each segment in accordance with a curve of the scan line. The binary image data is formed of images each of which corresponds to one line in the main scanning direction and the images correspond to a plurality of lines in the sub-scanning direction. The binary image data on different lines is transmitted through the switching of the lines. The lines to be switched are determined based on the profile information on the image forming apparatus 1. An image in which the curve of the scan line is corrected is formed by transmitting the binary image data while switching the line for each segment.

In FIG. 17, for the segments, an n-th line, an (n−1)-th line, an (n−2)-th line, an (n−3)-th line, an (n−4)-th line, the (n−3)-th line, the (n−2)-th line, the (n−1)-th line, the n-th line, an (n+1)-th line, the n-th line, and the (n−1)-th line are specified. The image data processor 703 reads out the binary image data from the image memory 1304 while switching the line of the binary image data in a specified order for each segment in the main scanning direction. The image data processor 703 transmits the binary image data of the line specified for each segment in the main scanning direction to the light emission controller 705. The binary image data is input to the light emission controller 705 for each segment while the line is being switched in accordance with the state of the curve of the scan line as described above, resulting in suppression of the position displacement and the decrease in image quality of the image finally formed.

Figure 18:
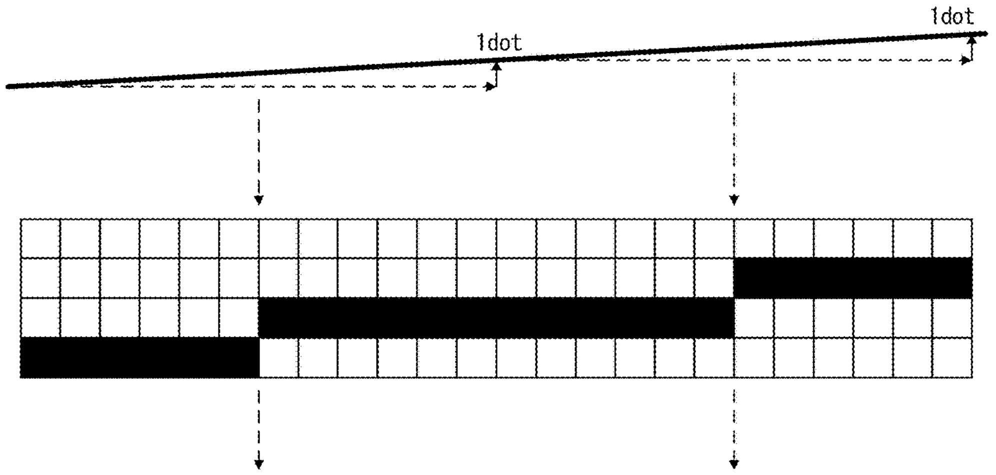
FIG. 18 is a partially enlarged view of a scan line.

FIG. 18 is a partially enlarged view of the scan line of FIG. 17. The line of the binary image data to be transmitted is set for each segment, and hence the DMA controller 1305 of the image data processor 703 generates the address for the reading out from the image memory 1304 in accordance with the curve of the scan line.

Figure 19:
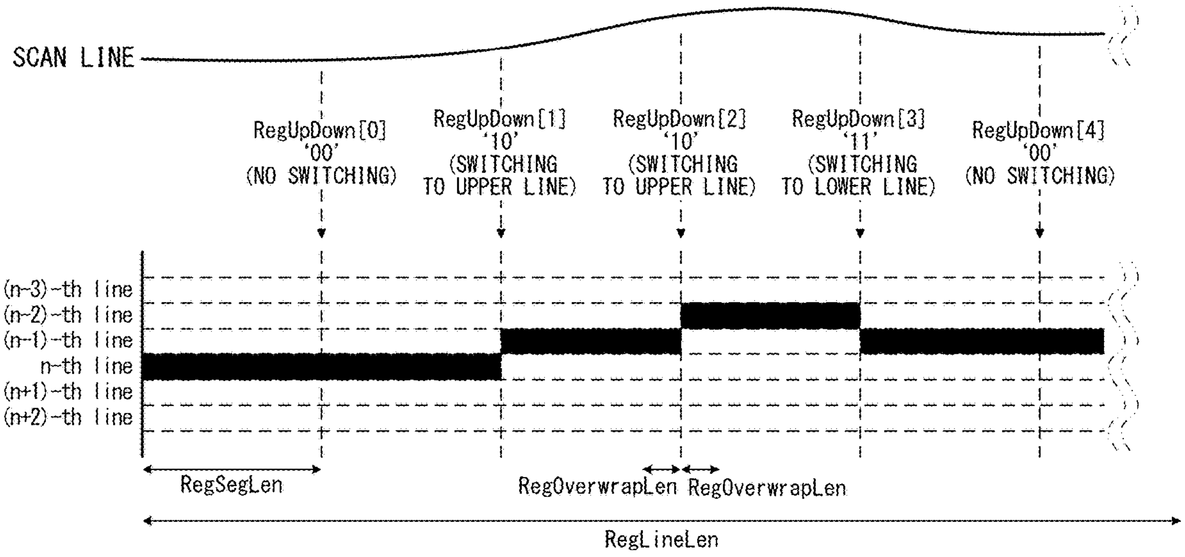
FIG. 19 is an operation explanatory diagram of the DMA controller.

FIG. 19 is an explanatory diagram of an operation of the DMA controller 1305. FIG. 19 is a diagram for illustrating a method (misregistration correction) of correcting the curve of the scan line by the DMA controller 1305.

To the register unit 1401 of the DMA controller 1305, a register RegSegLen used to specify the length of the segment in the main scanning direction is provided. To the register unit 1401, there is provided a group of a required number of registers RegUpDown[i] each of which specifies whether or not the line of the binary image data to be transmitted is switched between the segments next to each other in accordance with the curve of the scan line and a direction of the switching when the switching is made.

The number of values which the register RegUpDown[i] in the register group can take is three. Here, for the register RegUpDown[i] in the register group, a value of "00" or "01" is set when the line is not switched, a value of "10" is set when the line is switched to an upper line, and a value of "11" is set when the line is switched to a lower line. "i" is a value equal to or larger than 0 indicating an intermediation between segments.

To the register unit 1401, there is provided a register RegOverwrapLen which specifies, when the line is switched between the segments next to each other, a length of the data to be read before and after the switching portion. For the register unit 1401, a register RegStartAddr which specifies the start address of the binary image data stored in the image memory 1304 is set. For the register unit 1401, a register RegLineLen which indicates the length of the line of the binary image data is set. For the register unit 1401, a register RegLineOffset which specifies an offset value of the addresses of the lines next to each other of the binary image data is set. For the register unit 1401, RegBeams which specifies the number of lines to be transmitted to the exposure head corrector 1307 is set.

In the example of FIG. 19, the line is not switched between the first segment and the second segment. Thus, "00" is set for the register RegUpDown[0] in the register group. The line is switched upward between the second segment and the third segment. Thus, "10" is set for the register RegUpDown[1]. The line is switched upward between the third segment and the fourth segment. Thus, 10" is set for the register RegUpDown[2] in the register group. The line is switched downward between the fourth segment and the fifth segment. Thus, "11" is set for the register RegUpDown[3] in the register group. The line is not switched between the fifth segment and the sixth segment. Thus, "00" is set for the register RegUpDown[4] in the register group.

In the register unit 1401, each of the above-mentioned registers is set by the CPU 701. For the register unit 1401, a start register used to start the DMA operation is set after the CPU 701 has completed the setting of the registers as described above.

Figure 20:
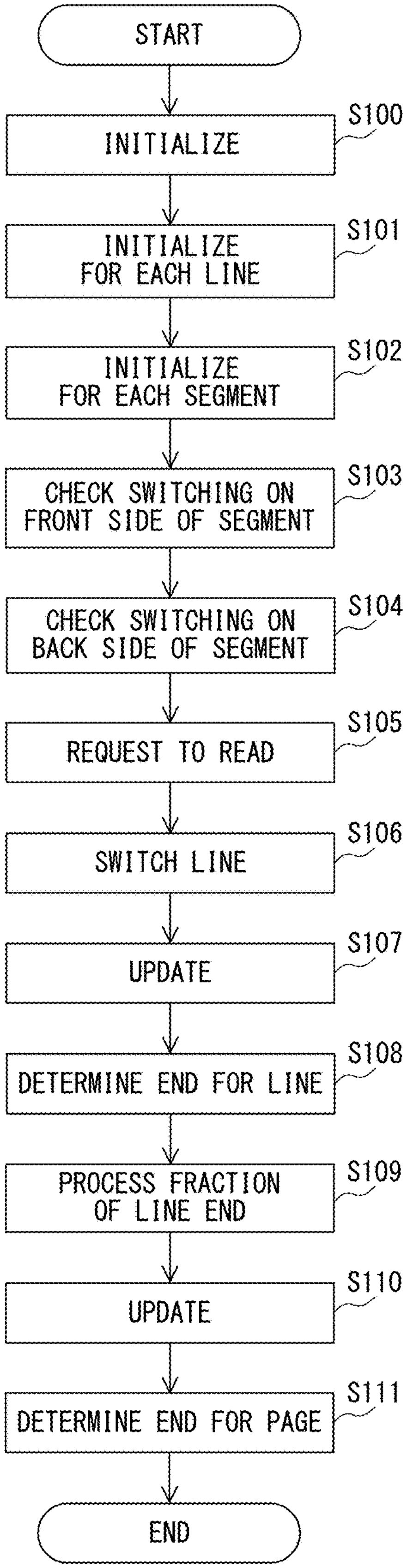
FIG. 20 is a flowchart for illustrating an operation of the DMA controller.
Figure 21A:
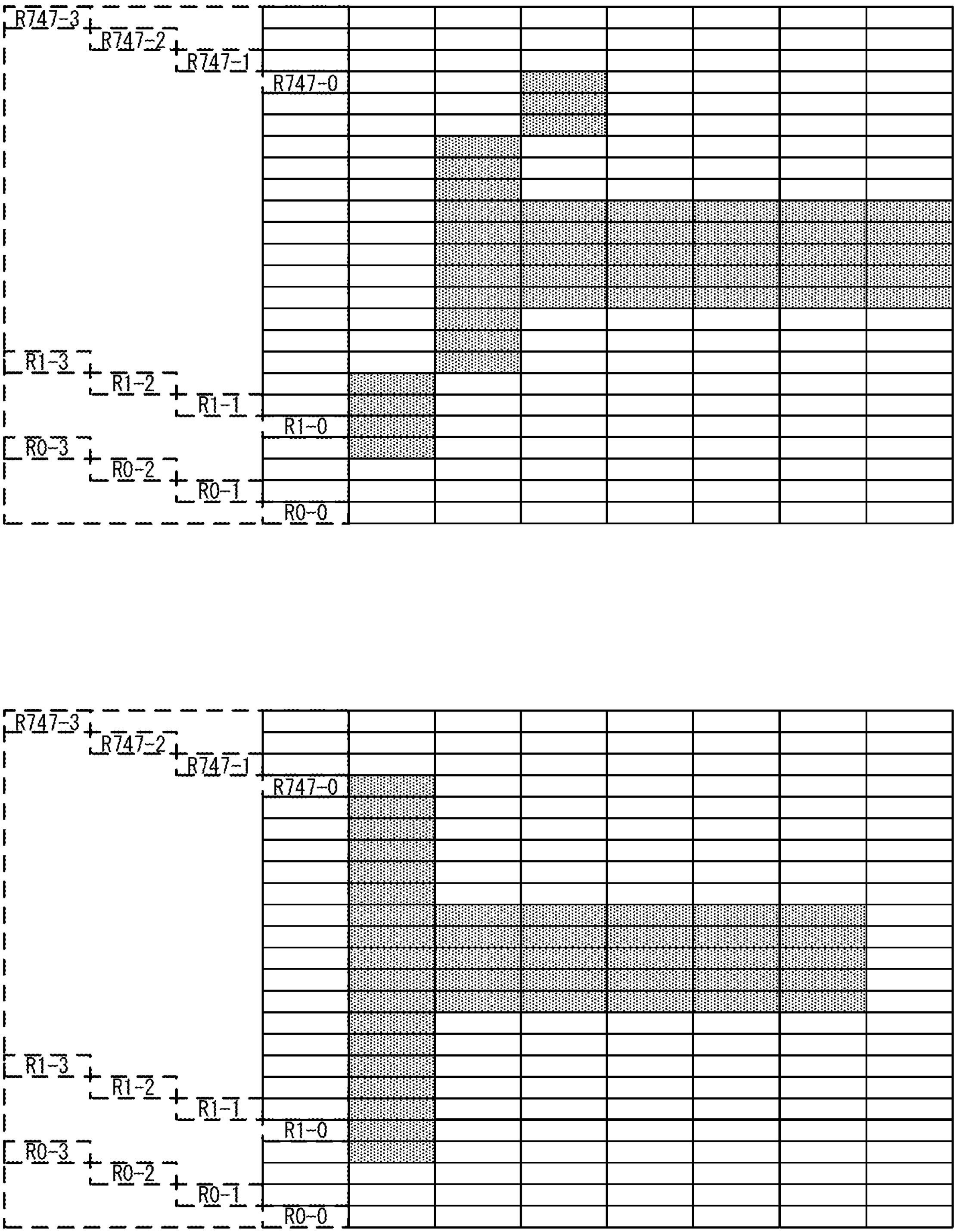
FIG. 21A and FIG. 21B are explanatory diagrams of an effect of correction of the misregistration.
Figure 21B:
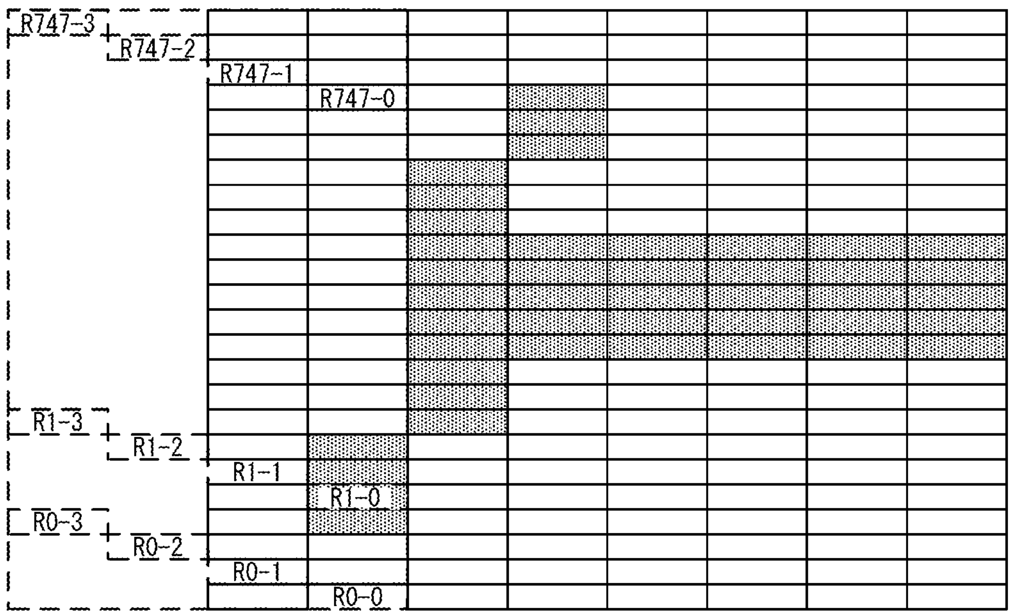
Figure 21B:
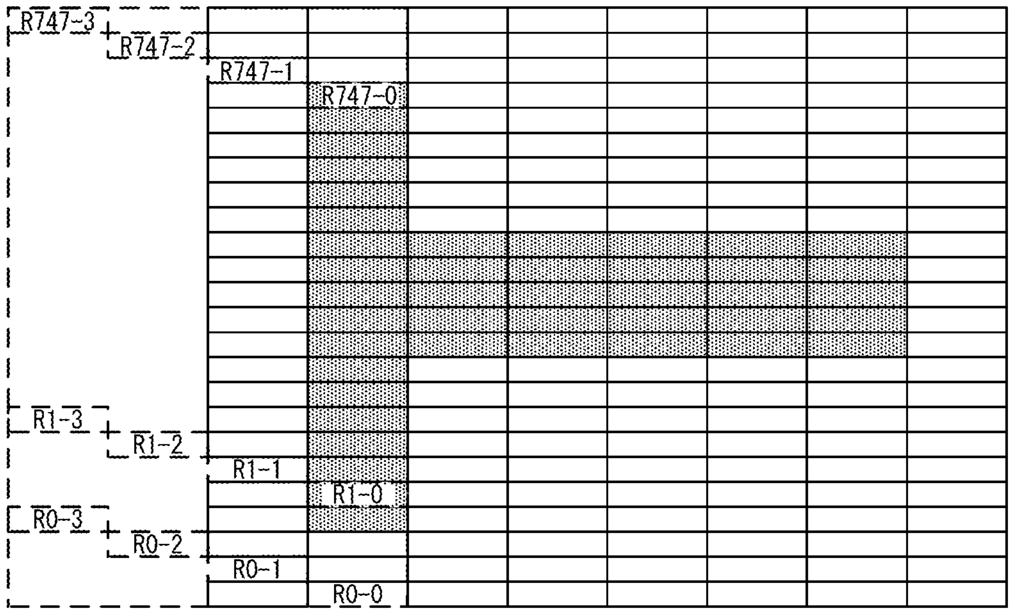

FIG. 20 is a flowchart for illustrating the operation of the DMA controller 1305. The address generator 1402 generates the addresses of the binary image data to be read out from the image memory 1304 for each segment. The address is determined in accordance with the state of the curve of the scan line.

Step S100: When the DMA controller 1305 starts the DMA operation in accordance with the instruction of the CPU 701, the DMA controller 1305 initializes a signal line_start_addr used to store the start address of each line in the register unit 1401 to the value of the register RegStartAddr. Moreover, the DMA controller 1305 initializes a signal line_cnt indicating the number of lines to be transmitted to the exposure head corrector 1307 to zero.

Step S101: The DMA controller 1305 executes initialization for each line. The initialization for each line includes the following contents. The signal seg_addr indicating the start address of the segment is initializes to the value of the signal line_start_addr. A signal line_data_cnt which is used to count a processed amount in the line is initialized to zero. A signal up_down_front indicating the line switching on a front side of the segment is initialized to "00." This indicates that the line is not switched on the front side of the segment at the start of the line. A signal "index" indicating an index of the register RegUpDown[i] in the register group to be referred to is initialized to zero.

Step S102: The DMA controller 1305 executes initialization for each segment. The initialization for each segment includes the following contents. The address signal and the length signal (addr and length) indicating the address and the length to be requested to the bus I/F unit 1403 are initialized to the signal seg_addr indicating the start address of the segment and the value of the register RegSegLen, respectively. Those signals are sometimes changed in subsequent processing. A line switching signal up_down_back indicating the line switching on a back side of the segment is set to the value of the group RegUpDown[i] in the register group.

Step S103: The DMA controller 1305 determines whether or not the line is to be switched on the front side of the segment based on the value of the signal up_down_front. When the line is switched on the front side of the segment, the DMA controller 1305 subtracts the value of the RegOverwrapLen from the address signal (addr) and adds the value of the RegOverwrapLen to the length signal (length). As a result, the overlap of the reading out of the binary image data is achieved on the front side of the segment. When the line is not switched on the front side of the segment, this processing is not executed.

Step S104: The DMA controller 1305 determines whether or not the line is switched on the back side of the segment based on the value of the line switching signal up_down_back. When the line is switched on the back side of the segment, the DMA controller 1305 adds the value of RegOverwrapLen to the length signal (length). As a result, the overlap of the reading out of the binary image data is achieved on the back side of the segment. When the line is not switched on the back side of the segment, this processing is not executed.

Step S105: The DMA controller 1305 uses the address signal (addr) and the length signal (length) to make the read request to the bus I/F unit 1403.

Step S106: The DMA controller 1305 determines whether or not the line is switched on the back side of the current segment in order to update the signal seg_addr indicating the start address of the segment to the start address of the next segment. Whether or not the line is switched on the back side of the current segment is determined based on the value of the line switching signal up_down_back.

When the address is to be switched to the upper line, the DMA controller 1305 subtracts the value of the register RegLineOffset from the signal seg_addr in order to switch the start address of the segment to the upper line. When the address is to be switched to the lower line, the DMA controller 1305 adds the value of the register RegLineOffset to the signal seg_addr in order to switch the start address of the segment to the lower line.

Step S107: When the line is not switched on the back side of the segment or after the signal seg_addr is updated, the DMA controller 1305 updates the various signals for the processing for the next segment. The update of the various signals includes the following contents. To the signal seg_addr, the value of the register RegSegLen is added. To the signal line_data_cnt used to count the processed amount in the line, the value of the register RegSegLen is added. The signal up_down_back indicating whether or not the line is switched on the back side of the current segment serves as the switching signal for the front side of the next segment. Thus, the value of the signal up_down_back is set for the signal up_down_front. In order to advance, by 1, the register RegUpDown[i] in the register group to be referred to, the signal "index" is incremented by 1.

Step S108: The DMA controller 1305 compares a value obtained by subtracting the value of the signal line_data_cnt from the value of the register RegLineLen with the value of the register RegSegLen to determine whether or not the processing for one line is to be finished. As a result of the comparison, when the difference is larger than the value of the register RegSegLen, there exist two or more segments to be processed. Thus, the DMA controller 1305 returns the process to Step S102, and repeats the processing for the segment. When the difference is smaller than the value of the register RegSegLen, the DMA controller 1305 executes the following processing to execute the processing for the last segment on the line.

Step S109: The DMA controller 1305 starts the processing for the last segment on the line to execute processing for a fraction of a line end of the one line. The DMA controller 1305 updates the address signal and the length signal (addr and length) indicating the address and the length to be requested to the bus I/F unit 1403. For the address signal and the length signal (addr and length), the signal seg_addr indicating the start address of the segment and the value obtained by subtracting the value of the signal line_data_cnt from the value of the register RegLineLen are set, respectively.

After that, the DMA controller 1305 determines whether or not the line is to be switched on the front side of the segment based on the value of the signal up_down_front. In the last segment on the line, only the switching signal up_down_front for the line on the front side of the segment is referred to. When the line is switched on the front side of the segment, the DMA controller 1305 subtracts the value of the RegOverwrapLen from addr and adds the value of the RegOverwrapLen to length. As a result, the overlap of the reading out of the binary image data is achieved on the front side of the segment.

When the line is not switched on the front side of the segment, or when the address signal and the length signal have been updated, the DMA controller 1305 makes the read request to the bus I/F unit 1403 in accordance with the address signal and the length signal.

Step S110: The DMA controller 1305 updates each signal for the processing for the next line. The DMA controller 1305 adds the value of the register RegLineOffset to the signal line_start_addr indicating the start address of each line, to thereby update the signal line_start_addr to the start address of the next line. The DMA controller 1305 increments, by 1, the signal line_cnt indicating the number of lines transmitted to the exposure head corrector 1307.

Step S111: The DMA controller 1305 compares the value of the signal line_cnt and the value of the register RegBeams with each other, to thereby make page end determination. When the value of the signal line_cnt is smaller than the value of the register RegBeams, the lines to be processed remain. Thus, the DMA controller 1305 returns the process to Step S101, and repeats the processing. When the value of the signal line_cnt is equal to or larger than the value of the register RegBeams, the DMA controller 1305 finishes the DMA processing. The DMA controller 1305 transmits an interrupt signal to the CPU 701 when the DMA processing is finished. The CPU 701 acquires the interrupt signal, to thereby detect the end of the DMA processing.

FIG. 21A and FIG. 21B and FIG. 22A and FIG. 22B are explanatory diagrams of an effect of the misregistration correction. A left diagram of each of FIG. 21A and FIG. 21B and FIG. 22A and FIG. 22B exemplifies a state of the print image data IM1 when the misregistration correction is not made by the DMA controller 1305. A right diagram of each of FIG. 21A and FIG. 21B and FIG. 22A and FIG. 22B exemplifies the state of the print image data IM1 when the misregistration correction is made by the DMA controller 1305.

The sequential output of the print image data IM1 on the plurality of lines from the light emission controller 705 remains the same irrespective of whether or not the misregistration correction is made. However, when the misregistration correction is made, the data on the line corresponding to the misregistration is output for each segment in the main scanning direction. Thus, the binary image data on the line for each segment is output from the light emission controller 705.

As described above, in the image forming apparatus 1 according to the at least one embodiment, even when the exposure head 106 is mounted to a position displaced from the ideal position with respect to the photosensitive member 102, the image data on the line corresponding to the displacement of the exposure head 106 is transmitted to the exposure head 106 for each segment in the main scanning direction. Thus, it is possible to suppress the positional displacement of the image on the sheet and the decrease in image quality caused by the displacement of the exposure head 106. That is, it is possible to suppress the positional displacement of the image and the decrease in image quality caused by the positional displacement of the exposure device.

Any one of the specific numerical values used in the description given above is an example, and the present disclosure is not limited to each numerical value used in the at least one embodiment. For example, the number of light emitting chips 400 mounted to one printed circuit board 202 is not limited to 20, and is only required to be one or more. Moreover, the number of light emitting elements 602 included in each light emitting chip 400 is not limited to 2,992. In the at least one embodiment, one light emitting chip 400 includes the four sets of the 748 light emitting elements 602 arranged along the main scanning direction, but the number of sets is only required to be one or more. The light emitting elements 602 are arranged at the pitch of approximately 21.16 μm corresponding to the resolution of 1,200 dpi in the main scanning direction, but the arrangement interval of the light emitting elements 602 is only required to be set in accordance with the resolution and the number of the light emitting elements 602. The number and the arrangement interval of the light emitting elements 602 of the exposure head 106 are only required to be determined in accordance with the resolution and the image size of the image to be formed by the image forming apparatus 1.

In the description given above, the line for reading out the binary image data from the image memory 1304 is determined for each segment, to thereby correct the misregistration. In addition to this method, the misregistration can be corrected by correcting the binary image data itself. For example, the image data processor 703 can correct the misregistration by moving the data in the sub-scanning direction for each segment when the quantization processing for the multi-valued bitmap data by the print data processor 1303 is executed.

Figure 22A:
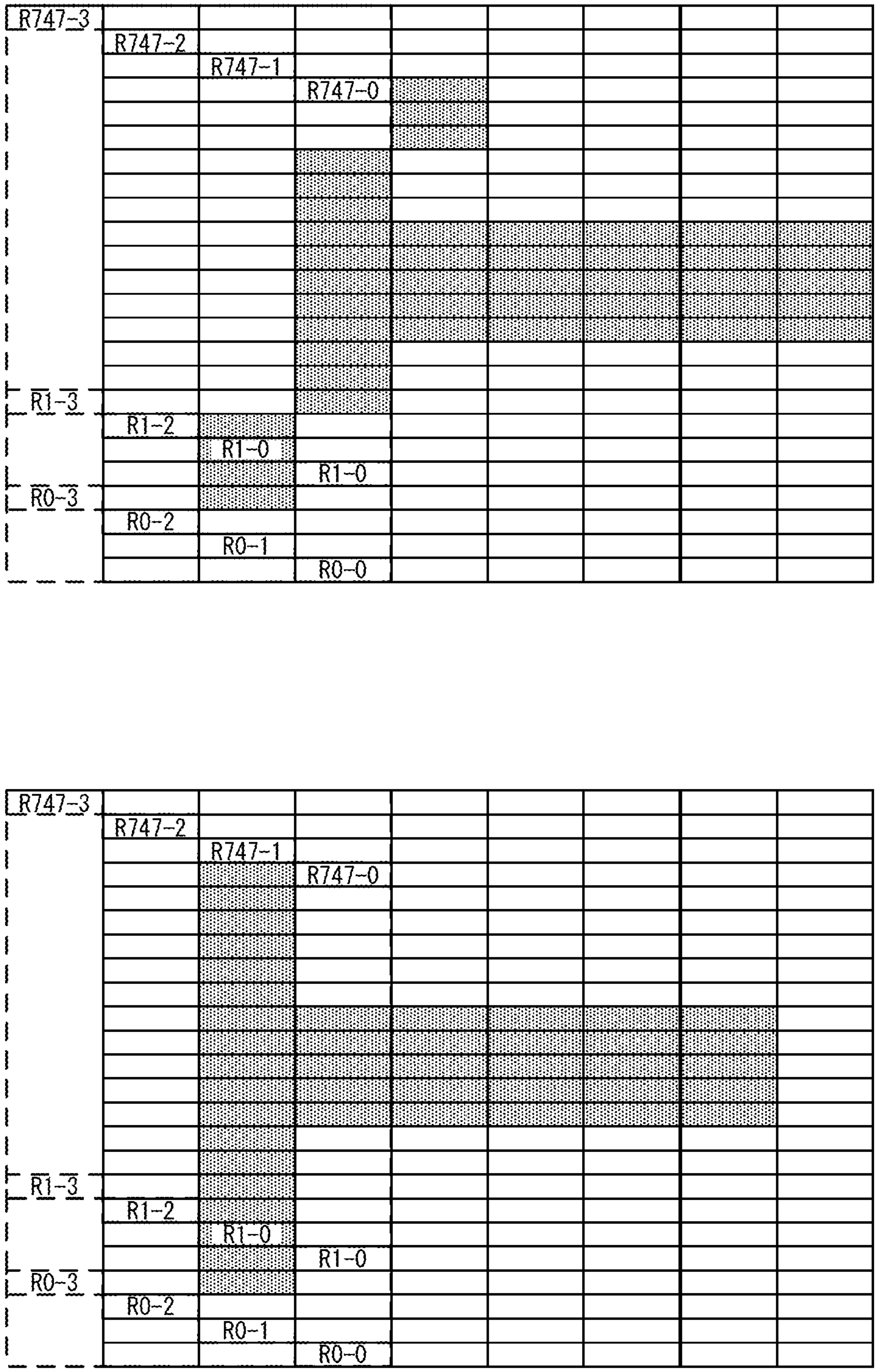
FIG. 22A and FIG. 22B are explanatory diagrams of the effect of the correction of the misregistration.
Figure 22B:
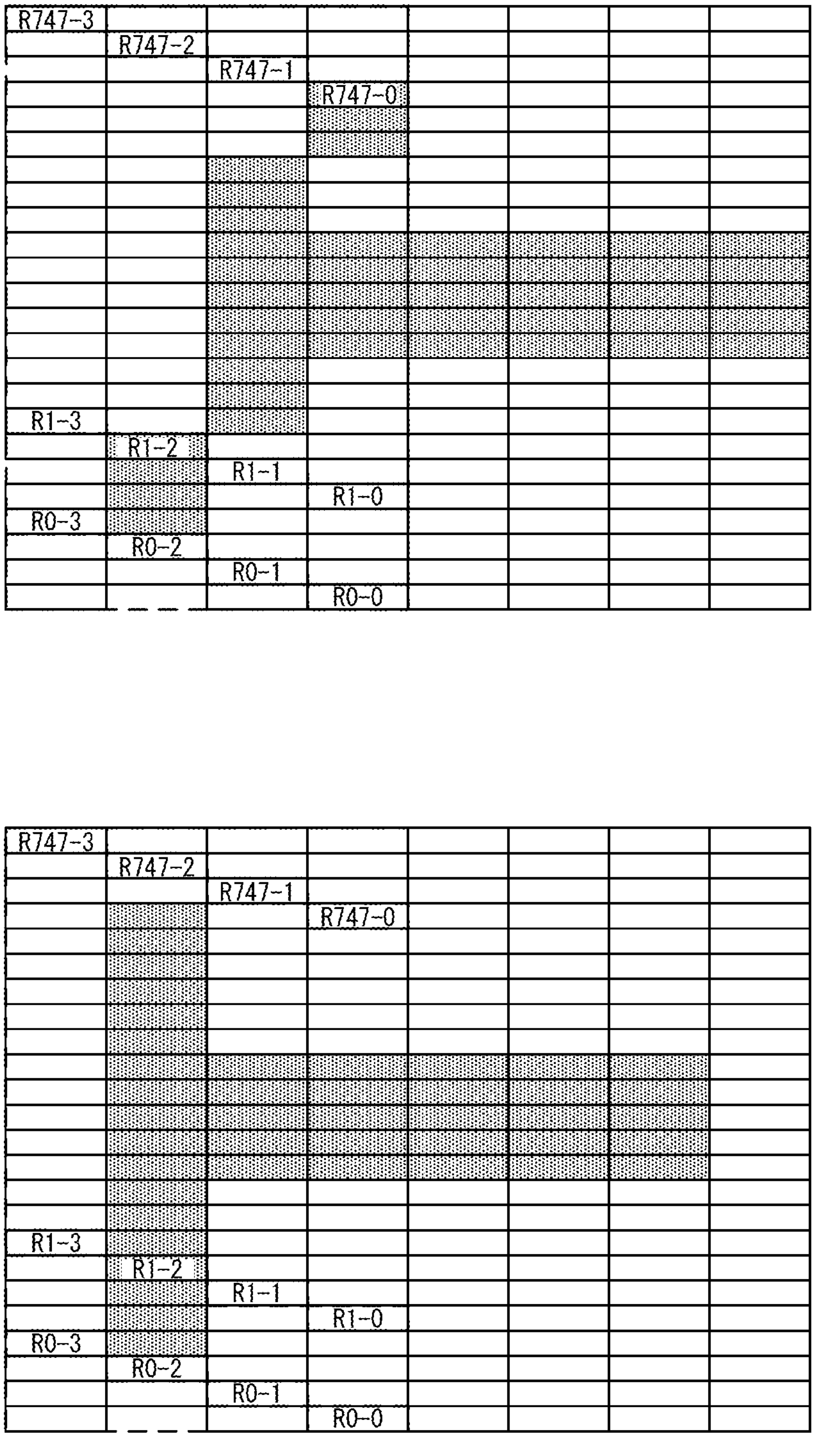

The print data processor 1303 corrects, based on the misregistration of the profile information, the multi-valued bitmap data, for example, the right diagram of FIG. 22A to the multi-valued bitmap data of the left diagram of FIG. 22B. As a result, the misregistration is corrected. The print data processor 1303 stores, in the image memory 1304, the binary image data generated by executing the quantization processing for the bitmap data obtained after the correction of the misregistration. The DMA controller 1305 reads out the binary image data line by line without switching the line to be read out for each segment when the binary image data is read out from the image memory 1304, and transmits the read binary image data to the exposure head corrector 1307. As a result, the image in which the misregistration has been corrected is acquired. Moreover, the correction of the multi-valued bitmap data and the switching of the line of the binary image data to be read out for each segment may be combined to correct the misregistration.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-087737, filed May 30, 2024, which is hereby incorporated by reference herein in its entirety.

What is claimed is:

1. An image forming apparatus comprising:

a photosensitive member;

an exposure head which includes a plurality of light emitting elements, and is configured to expose the photosensitive member through use of the plurality of light emitting elements to form an image; and at least one processor configured to transmit, to the exposure head, image data including pieces of data each of which indicates an image on one line in a first direction, the pieces of data corresponding to a plurality of lines arranged in a second direction orthogonal to the first direction, and to form an image corresponding to the image data on the photosensitive member through use of the exposure head, wherein the at least one processor is configured to:

divide the one line in the first direction into a plurality of segments;

correct, for each of the plurality of segments, a displacement of a position of exposure by the exposure head on the photosensitive member based on information indicating the displacement; and transmit the image data to the exposure head.

2. The image forming apparatus according claim 1, wherein the at least one processor is configured to transmit, for the each of the plurality of segments, to the exposure head, the image data on a line based on the information.

3. The image forming apparatus according claim 2, wherein the at least one processor is configured to determine, based on the information, the line of the image data to be transmitted to the exposure head for the each of the plurality of segments.

4. The image forming apparatus according claim 2, wherein the at least one processor includes:

an image memory configured to store the image data; and a DMA controller configured to read out the image data from the image memory, and wherein the DMA controller is configured to determine, in accordance with the information, an address at which the image data is to be read out from the image memory.

5. The image forming apparatus according claim 4, wherein the at least one processor includes a register for which a value indicating whether the line is to be switched for the each of the plurality of segments based on the information is to be set, and wherein the at least one processor is configured to determine an address at which the image data is to be read out from the image memory based on the value set for the register.

6. The image forming apparatus according claim 5, wherein the value indicating whether the line is to be switched for the each of the plurality of segments includes a value indicating a direction of the switching when the line is to be switched.

7. The image forming apparatus according claim 6, wherein the at least one processor is configured to read out the image data from the image memory without switching the line when the value set for the each of the plurality of segments does not indicate the switching of the line, and to read out the image data on a line in the direction of the switching from the image memory when the value indicates the switching of the line.

8. The image forming apparatus according claim 1, wherein the at least one processor is configured to transmit, for the each of the plurality of segments, to the exposure head, the image data that has been corrected based on the information.

9. The image forming apparatus according claim 8, wherein the at least one processor includes:

an image memory configured to store the corrected image data; and a DMA controller configured to read out the corrected image data from the image memory, and wherein the at least one processor is configured to transmit the corrected image data read out by the DMA controller to the exposure head.

10. The image forming apparatus according claim 1, further comprising a memory configured to store the information.

11. The image forming apparatus according claim 1, wherein the exposure head includes a plurality of light emitting chips each including a plurality of light emitting elements mounted thereon, and wherein the plurality of light emitting chips are arranged in a staggered pattern in the first direction.

* * * * *